US011976809B2

(12) United States Patent
Dong

(10) Patent No.: US 11,976,809 B2
(45) Date of Patent: May 7, 2024

(54) LIGHT BULB FOR VEHICLES

(71) Applicant: Xin Dong, Bastrop, TX (US)

(72) Inventor: Xin Dong, Bastrop, TX (US)

( * ) Notice: Subject to any disclaimer, the term of this patent is extended or adjusted under 35 U.S.C. 154(b) by 0 days.

(21) Appl. No.: 18/161,691

(22) Filed: Jan. 30, 2023

(65) Prior Publication Data

US 2024/0003524 A1 Jan. 4, 2024

Related U.S. Application Data

(63) Continuation of application No. 17/855,458, filed on Jun. 30, 2022, now Pat. No. 11,566,781.

(51) Int. Cl.

| | |
|---|---|
| ***F21V 23/00*** | (2015.01) |
| ***F21V 19/00*** | (2006.01) |
| ***F21V 23/06*** | (2006.01) |
| *F21S 45/00* | (2018.01) |
| *F21Y 115/10* | (2016.01) |

(52) U.S. Cl.
CPC .......... *F21V 23/005* (2013.01); *F21V 19/003* (2013.01); *F21V 23/06* (2013.01); *F21S 45/00* (2018.01); *F21Y 2115/10* (2016.08)

(58) Field of Classification Search
CPC ...... F21V 23/005; F21V 19/003; F21V 23/06; F21S 45/00; F21Y 2115/10
See application file for complete search history.

(56) References Cited

U.S. PATENT DOCUMENTS

| | | | | |
|---|---|---|---|---|
| 7,815,339 | B2 * | 10/2010 | Veenstra | F21S 43/195 362/249.02 |
| 9,909,752 | B2 * | 3/2018 | Elwell | F21S 45/47 |
| 9,970,622 | B2 * | 5/2018 | Helbig | F21S 45/48 |
| 10,260,684 | B2 | 4/2019 | Elzinga | |
| 10,415,787 | B2 | 9/2019 | Lessard et al. | |
| 10,883,711 | B1 | 1/2021 | Xie | |
| 11,125,428 | B2 | 9/2021 | Zhou et al. | |
| 2009/0175044 | A1 | 7/2009 | Veenstra et al. | |
| 2010/0181885 | A1 * | 7/2010 | Tessnow | F21S 43/14 313/1 |
| 2019/0360681 | A1 | 11/2019 | Zhou et al. | |
| 2021/0396370 | A1 * | 12/2021 | Kessels | F21V 23/06 |

* cited by examiner

*Primary Examiner* — Evan P Dzierzynski
(74) *Attorney, Agent, or Firm* — NZ Carr Law Office

(57) ABSTRACT

The present disclosure provides a light bulb for use in a lamp housing of a vehicle. The light bulb includes a bulb body assembly having one or more light sources fixedly attached thereto, and a mounting assembly configured to mount on the lamp housing. The bulb body assembly and the mounting assembly are connected by a rotatable joint such that positions of the one or more light sources can be adjusted after the mounting assembly is mounted on the lamp housing. In some embodiments, a key portion is attached to the bulb body assembly to rotate the bulb body assembly relative to the mounting assembly.

20 Claims, 24 Drawing Sheets

LIGHT BULB FOR VEHICLES

CROSS-REFERENCE TO RELATED APPLICATIONS

This application is a continuation application of U.S. patent application Ser. No. 17/855,458, filed Jun. 30, 2022, which is incorporated by reference in its entirety.

FIELD OF DISCLOSURE

The present disclosure relates to a light bulb for vehicles. Particularly, embodiments of the present disclosure relate to light-emitting diode (LED) light bulbs for use in vehicles.

BACKGROUND OF THE DISCLOSURE

Motor vehicles contain numerous lighting devices for both interior and exterior illumination. Typically, there are various standards and requirements by government or insurance agencies to regulate these functions for safety reasons. For example, government standards require a headlamp to form certain illuminating patterns for driving safety. The illuminating patterns are realized using specific optical devices in the vehicle, such as reflectors and/or lenses and by aligning a light bulb with the optical devices.

Because light bulbs, such as LED light bulbs, are sometimes directional or nonsymmetrical, when installing or replacing a light bulb in a vehicle light, the orientation of the light bulb may need to be adjusted or fine-tuned to align with the optical device in the vehicle light. Conventional adjusting and tuning processes may need to repeatedly pull the light bulb out of the vehicle to make adjustments and insert the light bulb back into the vehicle.

Embodiments of the present disclosure provide an improved vehicle light bulb for easy installation.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

Figure 1A:
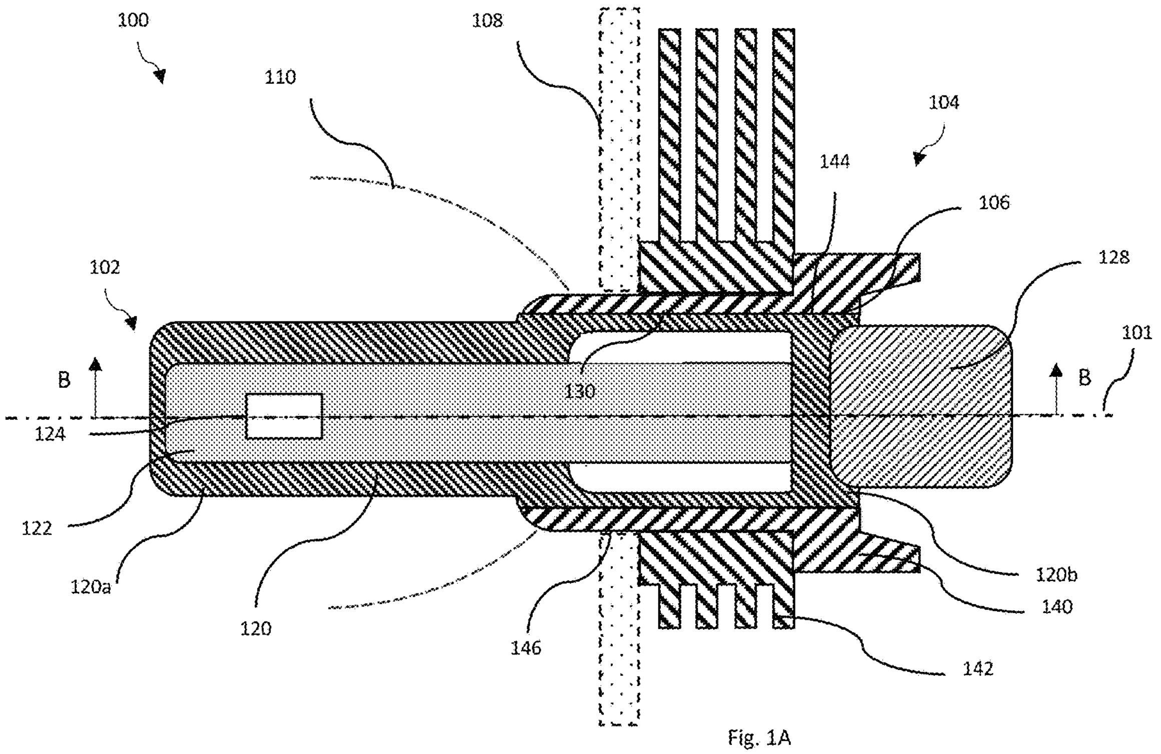
FIGS. 1A-1D schematically demonstrate a light bulb according to the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present disclosure relate to a light bulb. Particularly, embodiments of present disclosure relate to a light bulb to use with an optical assembly in a vehicle. The term "vehicle" or other similar term used herein are inclusive of motor vehicles in general such as land vehicles, watercrafts and aircraft that are propelled by motors, which may be driven by fuels derived from resources other than petroleum, electricity, hydrogen, or combinations thereof. For example, vehicles may include passenger automobiles such as sedans, sport utility vehicles, buses, trucks, and the like, transport vehicles such as commercial fleet vehicles, industrial vehicles such as tractors, skeet gears, excavators, and the like, as well as powersports vehicles.

Figure 1B:
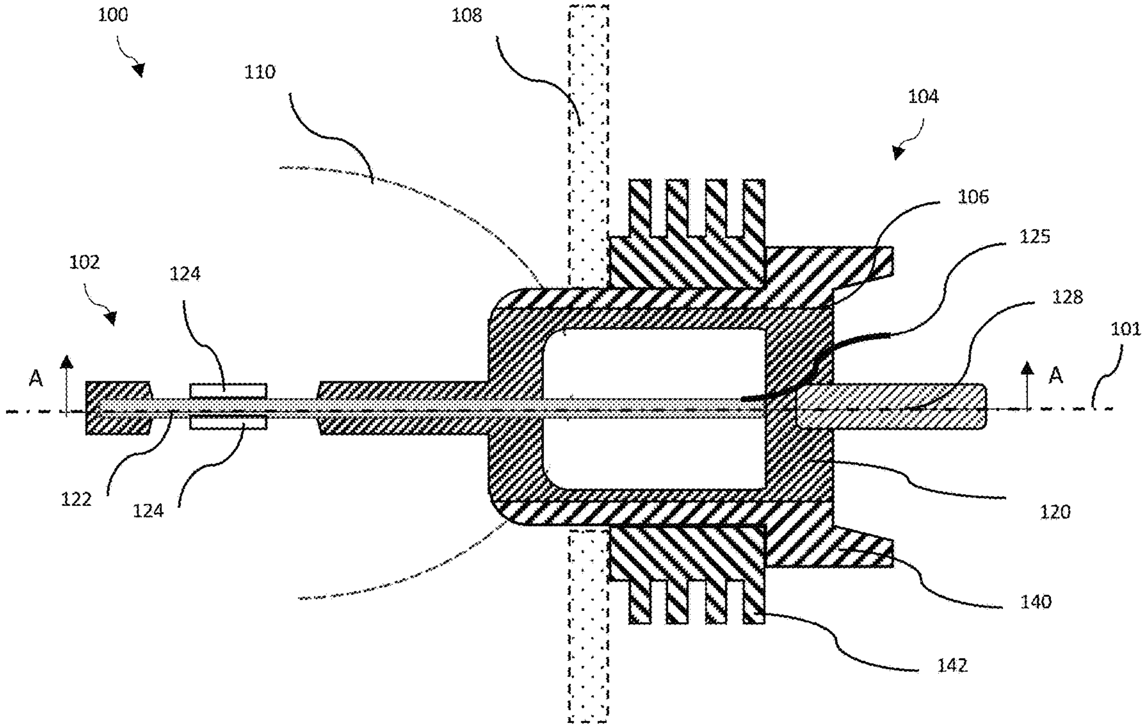
Figure 1C:
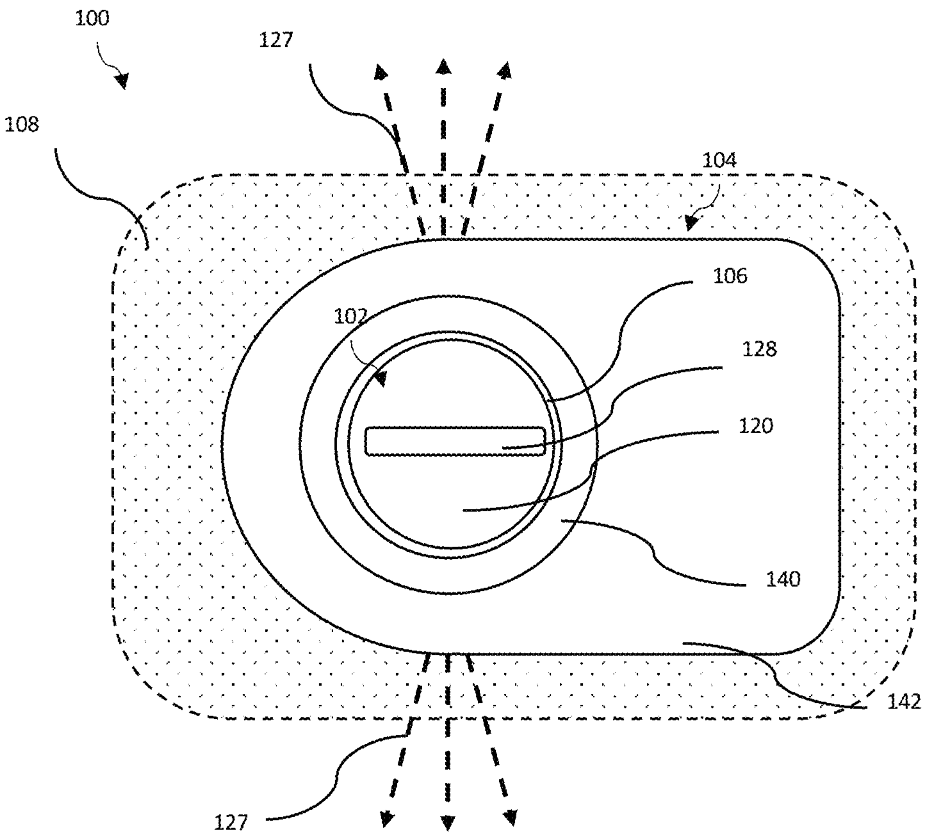
Figure 1D:
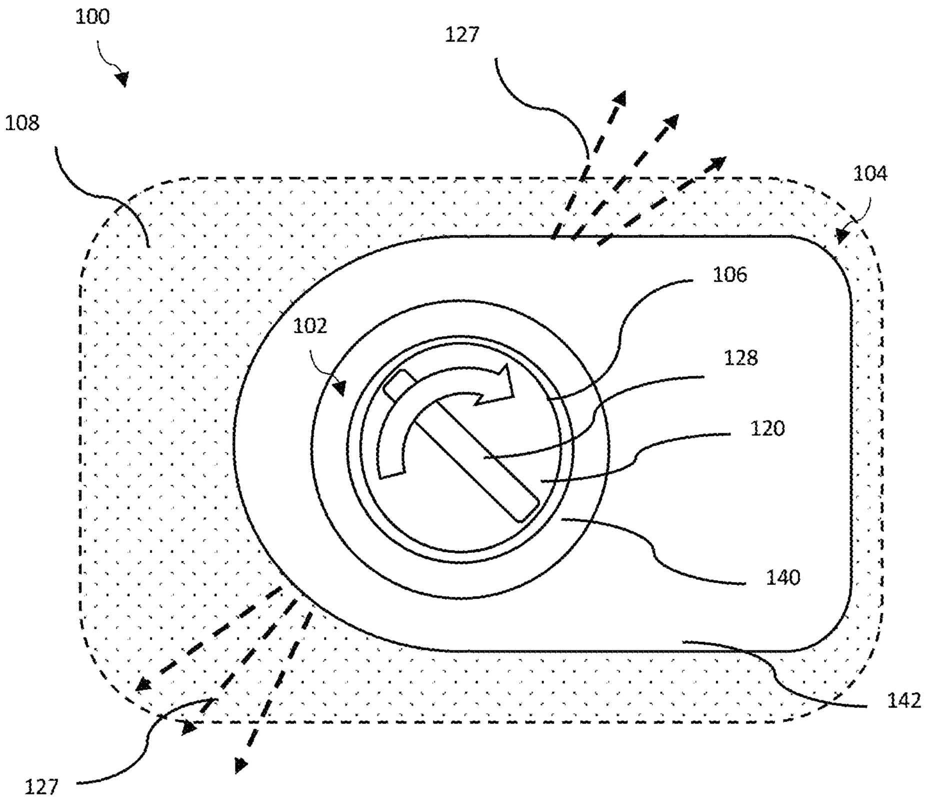

FIGS. 1A-1D schematically demonstrate a light bulb 100 according to the present disclosure. FIGS. 1A and 1B are schematic sectional views of the light bulb 100. FIG. 1A is a sectional view along the line A-A in FIG. 1B. FIG. 1B is a sectional view along the line B-B in FIG. 1A. FIGS. 1C and 1D are schematic side views of the light bulb 100 at different positions.

The light bulb 100 may include a bulb body assembly 102 and a mounting assembly 104. The bulb body assembly 102 includes one or more light sources and is configured to generate light beams. The mounting assembly 104 may include structures to mount the light bulb 100 on a lamp housing, such as a vehicle lamp housing. The bulb body assembly 102 and the mounting assembly 104 are rotatably connected. According to embodiments of the present disclosure, the bulb body assembly 102 is rotatable relative to the mounting assembly 104 when the mounting assembly 104 is mounted on a lamp housing so that position of the light sources in the bulb body assembly 102 is adjustable relative to the lamp housing, with the light bulb 100 remaining mounted in the lamp housing.

In some embodiments, the bulb body assembly 102 may include a rotatable body 120, a light source circuit board 122 having one or more light sources 124, and a key portion 128. In some embodiments, the rotatable body 120 may have a substantially elongated body having a first end 120*a* and a second end 120*b* along a central axis 101. Even though shown as one piece in FIGS. 1A-1B, the rotatable body 120 may include more than one piece connected to together. The light source circuit board 122 may be attached to the rotatable body 120 near the first end 120*a*. The key portion 128 is disposed near the second end 120*b* of the rotatable body 120. The rotatable body 120 may have an outer profile 130 near the second end 120*b*. The outer profile 130 is shaped to connect with the mounting assembly 104. In some embodiments, the outer profile 130 is a cylindrical profile about the central axis 101 to allow rotatable connection with the mounting assembly 104.

The light source circuit board 122 may be a printed circuit (PCB) board on which the one or more light sources 124 are installed. In some embodiments, the one or more light sources 124 may be one or more light-emitting (LED) diodes, laser diodes, or combinations thereof. The light source circuit board 122 may include drive circuits and/or control circuits to the one or more light sources 124. In some embodiments, the light source circuit board 122 is attached to the rotatable body 120 such that the one or more light sources 124 are located near the central axis 101. In some embodiments, as shown in FIGS. 1A and 1B, the light sources 124 are mounted on both a front side and a back side of the light source circuit board 122, and symmetrical about the central axis 101. Alternatively, the light sources 124 may be mounted on only one side of the light source circuit board 122. In some embodiments, the bulb body assembly 102 may include two or more light source circuit boards 122 according to the design. For example, two or more light source circuit boards 122 may be used to position the drive circuits and control circuits of the light sources 124. The light sources 124 and the drive circuits may be disposed separately on the two or more light source circuit boards 122, which may be disposed at different locations. Alternatively, two or more light source circuit boards 122 may be used to position the light sources 124 in various positions. For example, the four circuit boards may form a rectangular column to have light sources 124 mounted on four sides of the rectangular column.

The light source circuit board 122 may be fixedly attached to the rotatable body 120. In some embodiments, the light source circuit board 122 may be mounted on the rotatable body 120 by any suitable means, for example by screws, pins, adhesives, keys and splines, or the like. A connection cord 125 may extend from the light source circuit board 122 to out of the light bulb 100 to connect the light source circuit board 122 with a power supply. The connection cord 125 may exit light bulb 100 through any suitable paths, for example, through the second end 120*b* of the rotatable body 120 or through the mounting assembly 104.

The key portion 128 is connected to the rotatable body 120 to enable movement of the rotatable body 120 and the light source circuit board 122 relative to the mounting assembly 104. When assembled, the key portion 128 may extend out from the mounting assembly 104 to allow easy operation. In some embodiments, the key portion 128 and the rotatable body 120 may be formed in a unitary body. In some embodiments, the key portion 128 is permanently attached to the rotatable body 120, for example by screws, pins, adhesives, or the like. In some embodiments, the detachable key 128 may be formed from a heat conductive material and function as a heat dissipation plate during operation. In other embodiments, the key portion 128 is detachedly attached to the rotatable body 120 and may be attached during installation and removed when installation is complete.

The mounting assembly 104 is configured to connect the light bulb 100 to a lamp housing. In some embodiments, the mounting assembly 104 may include a mounting frame 140. The mounting frame 140 may include a mounting feature to allow the light bulb 100 secured attached to a lamp housing. As shown in FIGS. 1A and 1B, the mounting frame 140 includes one or more mounting features 146 to mount the light bulb 100 on a lamp housing 108. For example, the mounting feature 146 may be a collar portion having an outer diameter matching an opening through a lamp housing 108. Additional mounting features, such as bolts, screws, alignments pins, and the like, may be used to secure the mounting frame 140 to the lamp housing 108.

The mounting frame 140 may include an inner profile 144 to receive the bulb body assembly 102. Particularly, the inner profile 144 may be shaped to match the outer profile 130 of the rotatable body 120. The inner profile 144 of the mounting frame 140 and the outer profile 130 of the rotatable body 120 form a rotatable joint 106. The rotatable joint 106 allows the bulb body assembly 102 to be securely attached to the mounting assembly 104 and rotatable when a torque is applied. The rotatable joint 106 may be any suitable connections. In some embodiments, the rotatable joint 106 is a tight cylindrical fitting. The outer profile 130 and the inner profile 144 are substantially smooth surfaces in matching cylindrical shapes. A tolerance between diameters of the inner profile 144 and the outer profile 130 is selected to be in a range to for a rotatable tight fitting. The rotatable tight fitting not only allows the bulb body assembly 102 to rotate relative to the mounting assembly 104 when a torque of predetermined value is applied during installation but also prevents undesired rotation after installation. In other embodiments, the rotatable joint 106 may be a threaded fitting. The inner profile 144 on the mounting frame 140 and the outer profile 130 on the rotatable body 120 may include threaded portions with matching threads. The relative positions of the mounting frame 140 and the rotatable body 120 may be adjusted using the threaded portions. In some embodiments, the threaded portions may have a short pitch such that a change in axial position from the adjustment rotation may be disregarded.

Optionally, the mounting assembly 104 includes a heatsink 142 configured to facilitate dissipation of heat generated by the light sources 124 and the drive circuits or the control circuits thereof. The heatsink 142 may include a plurality of surface undulations to provide additional surface area for heat dissipation. The heatsink 142 may be made from materials with good heat conductivity. In some embodiments, the heatsink 142 may be made of metal, such as aluminum, copper, steel, or an alloy thereof. The heatsink 142 and the mounting frame 140 may include multiple pieces joined together. In some embodiments, the mounting frame 140 may be formed from material with good heat conductivities to promote heat dissipation, such as aluminum, copper, steel, or an alloy thereof. Similarly, the rotatable body 120 and the key portion 128 may be formed from material with good heat conductivities to promote heat dissipation, such as aluminum, copper, steel, or an alloy thereof.

As shown in FIGS. 1A and 1B, an optical assembly 110 is located in the lamp housing 108. The optical assembly 110 may include reflectors, lenses, or a combination thereof. The optical assembly 110 is typically fixedly positioned within the lamp housing 108. During installation, the light bulb 100 is mounted on the lamp housing 108 by aligning the mounting feature 146 with the lamp housing 108 and inserting the first end 120*a* of the rotatable body 120 into the lamp housing 108. At this point, the light bulb 100 is in position: the light sources 124 are positioned in the lamp housing 108 while the second end 120*b* of the rotatable body 120, the key portion 128, and the heatsink 142 are disposed outside the lamp housing 108. For one reason or another, for example the light bulb 100 or the optical assembly 110 being non-symmetrical, the light sources 124 may not be aligned with the optical assembly 110 to generate the target illumination pattern. To align the light sources 124 with the optical assembly 110, the key portion 128 may be turned to rotate the bulb body assembly 102/the light sources 124 relative to the mounting assembly 104/the lamp housing 108/the optical assembly 110. As shown in FIGS. 1C and 1D, rotation of the key portion 128 corresponds to the rotation of light beams 127.

The light bulb 100 may be used as a new or replacement bulb in suitable vehicle lightings. Because the bulb body assembly 102 goes through the mounting assembly 104 and is rotatably connected to the mounting assembly 104, the key portion 128 at one end of the bulb body assembly 102 may be used as a tool for rotating the bulb body assembly 102 during installation. The key portion 128 according to the present disclosure simplifies light bulb installation with a convenient and intuitive bulb position adjustment.

Figure 2A:
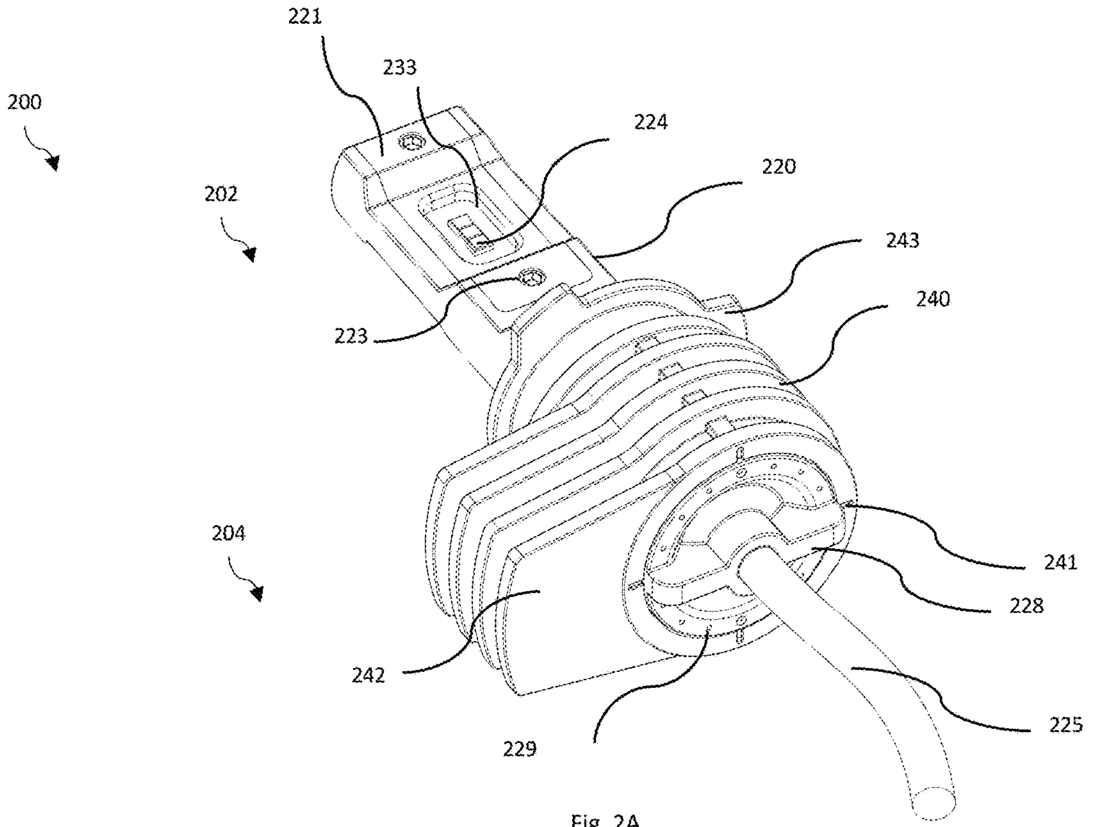
FIGS. 2A-2J schematically illustrate a light bulb according to one embodiment of the present disclosure.
Figure 2B:
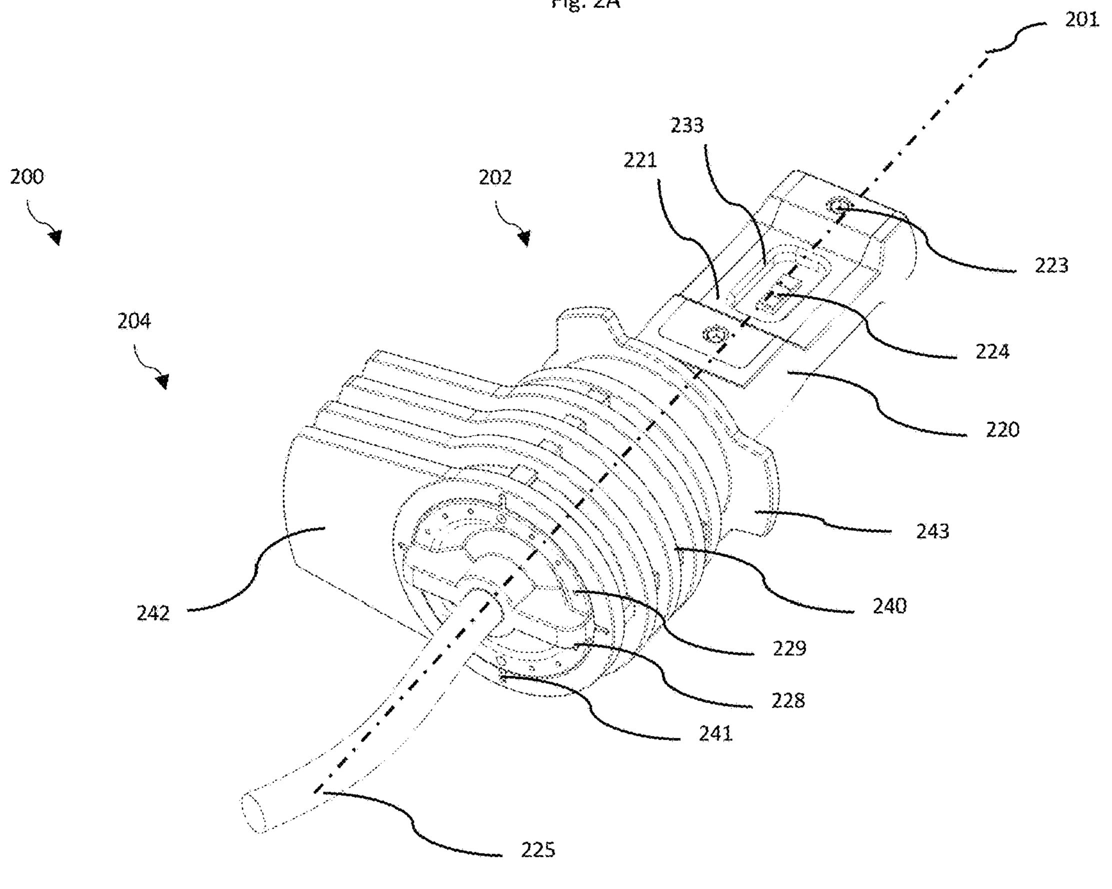
Figure 2C:
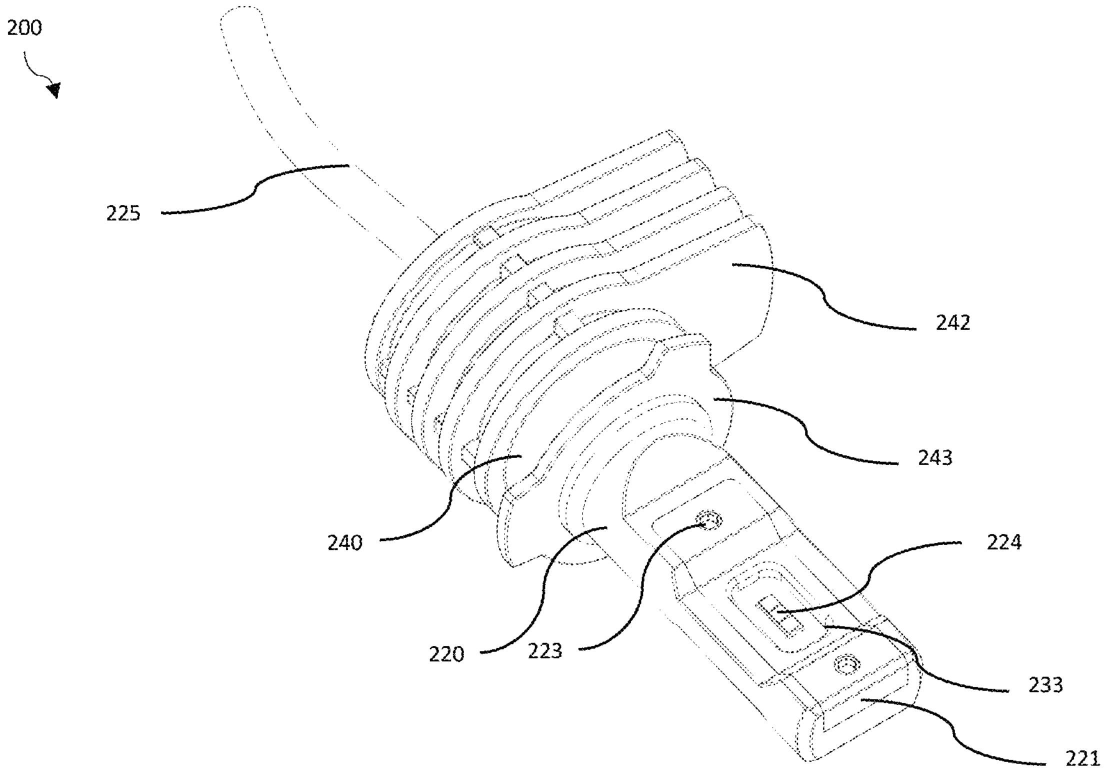
Figure 2D:
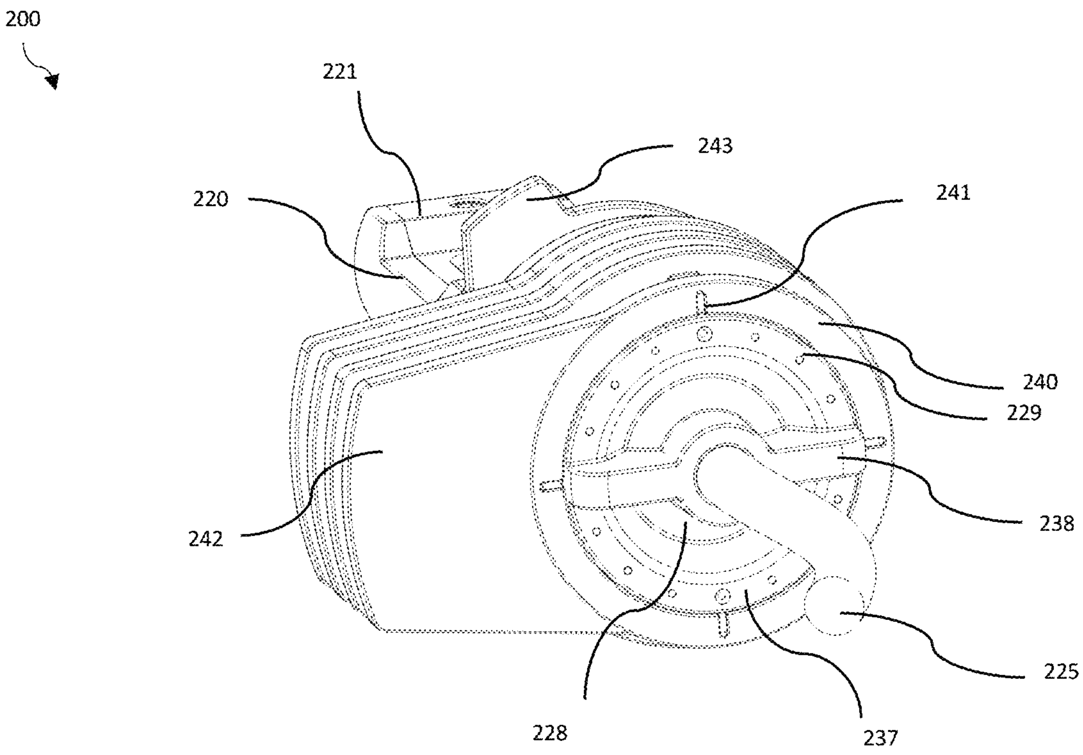
Figure 2E:
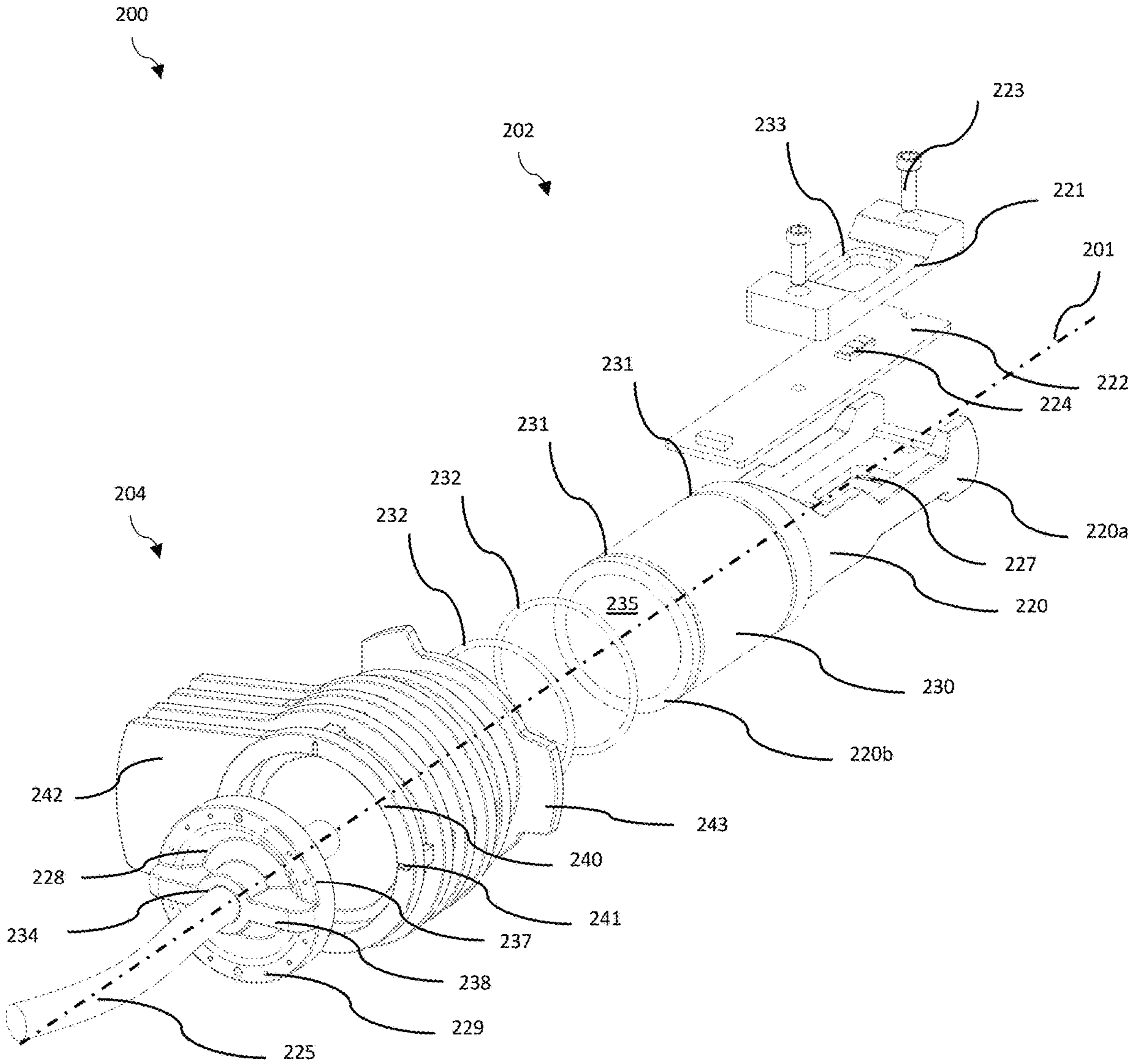
Figure 2F:
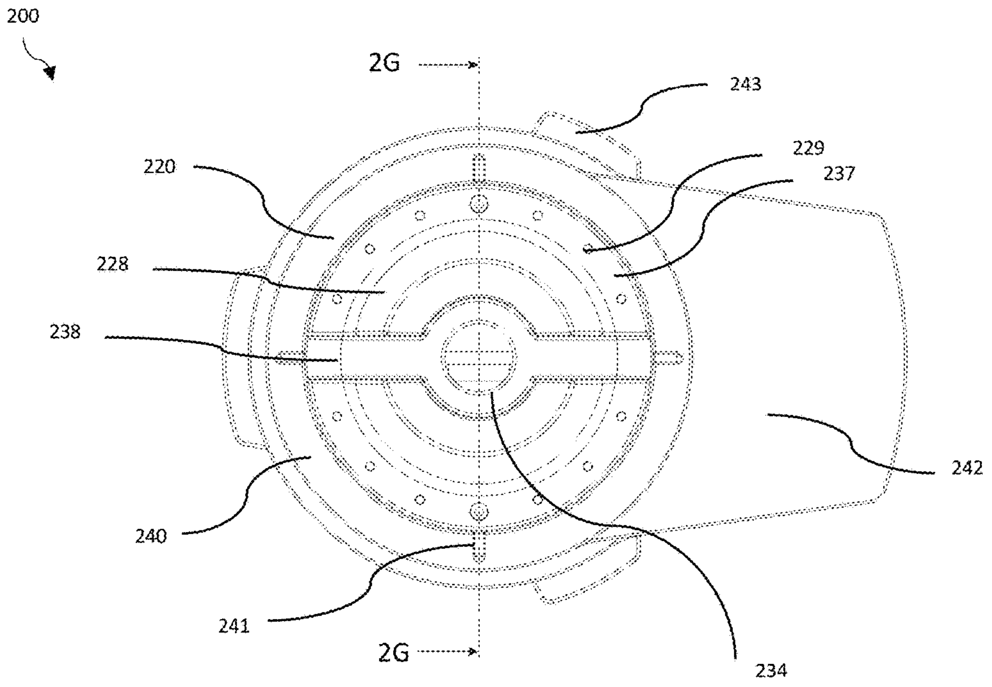
Figure 2G:
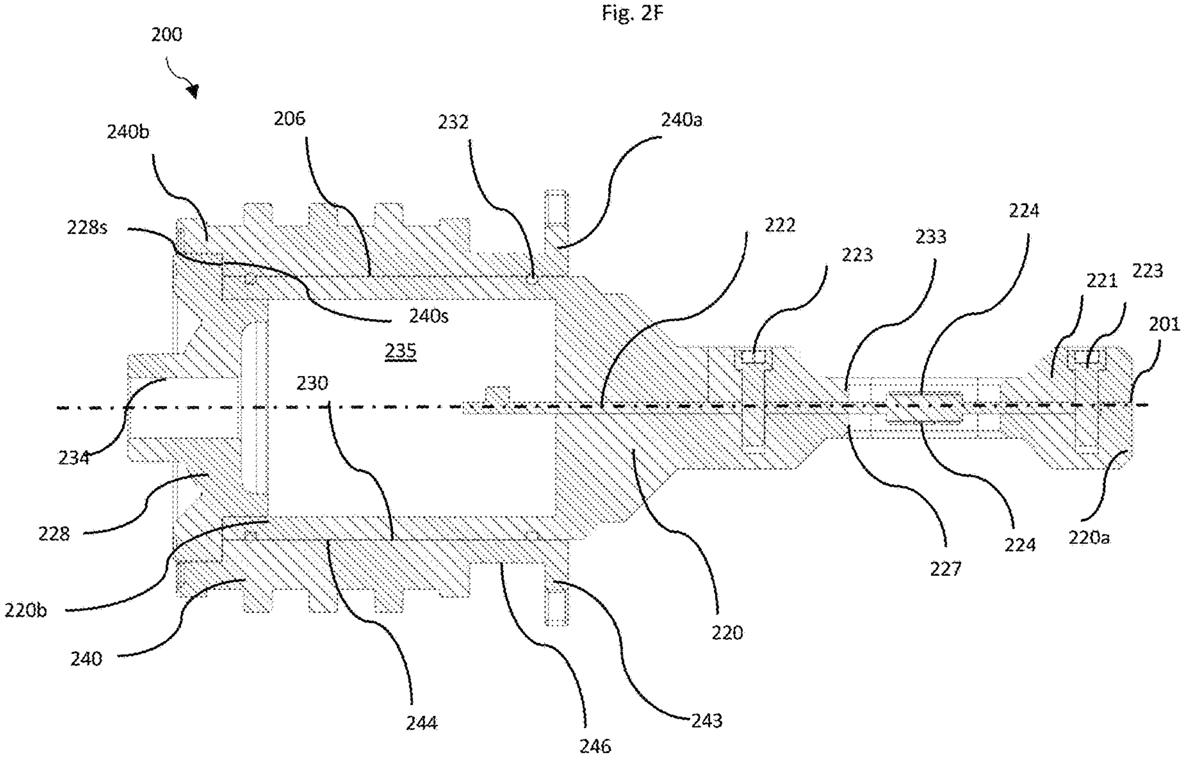
Figure 2H:
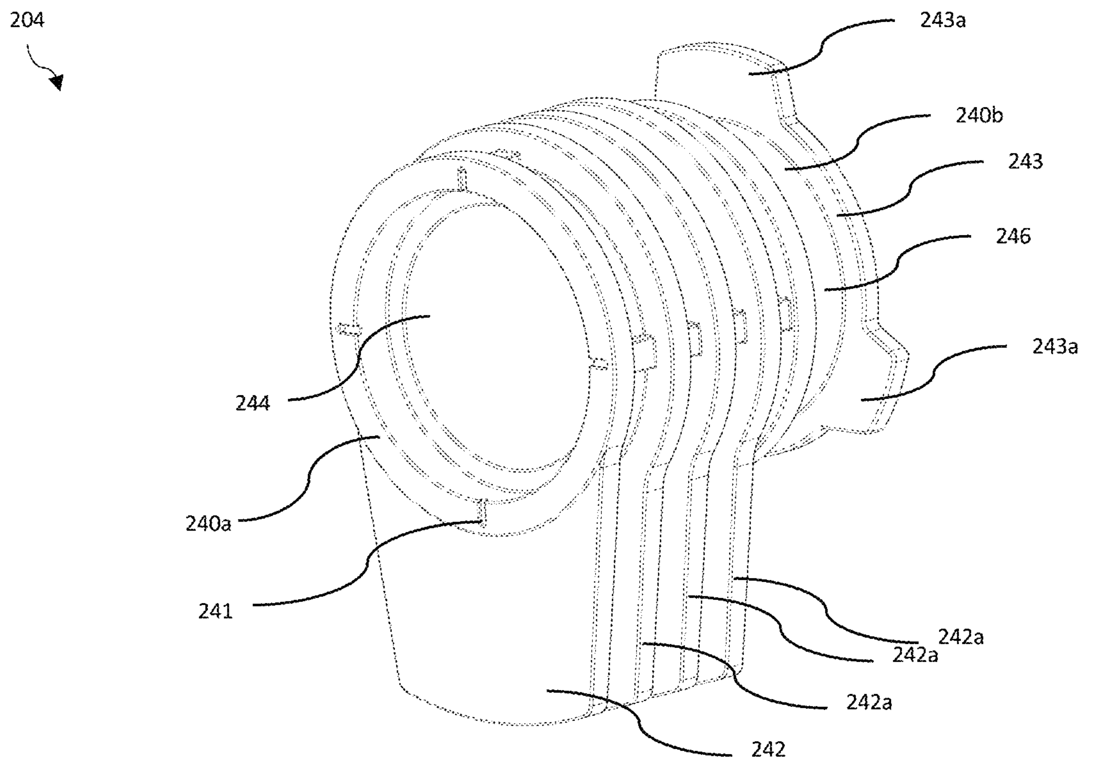
Figure 2I:
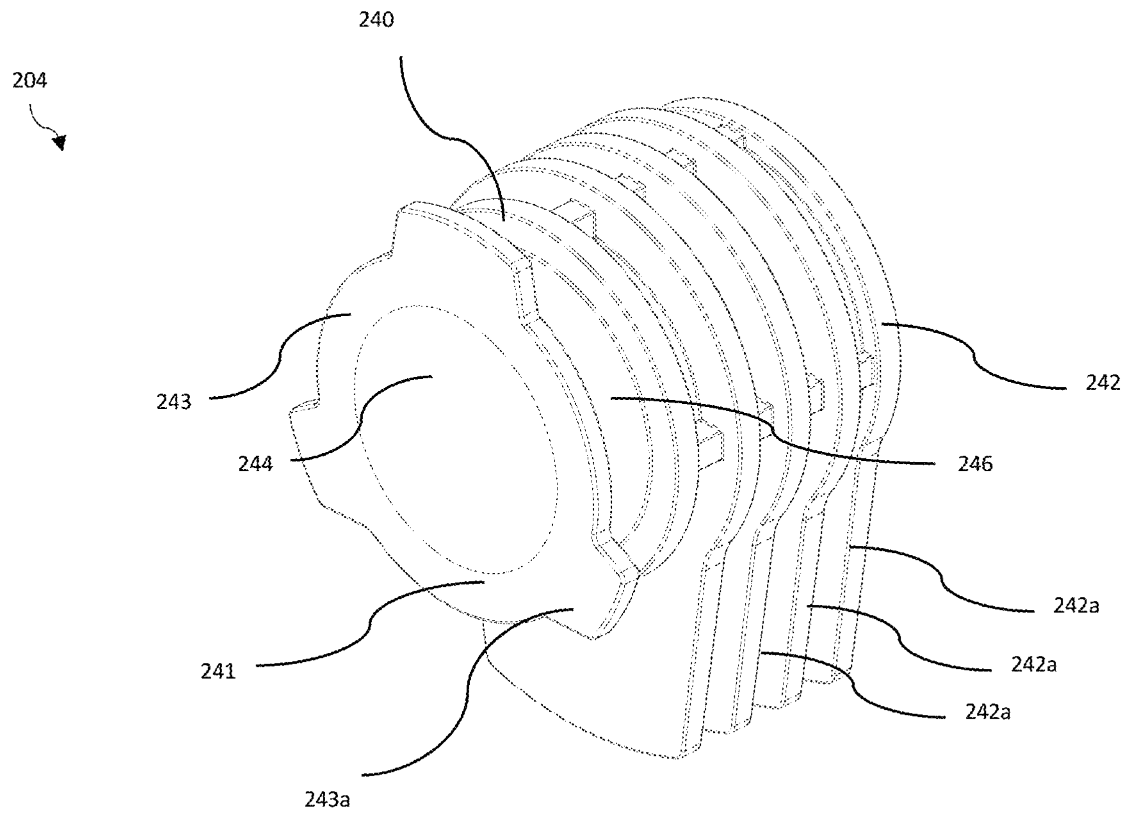
Figure 2J:
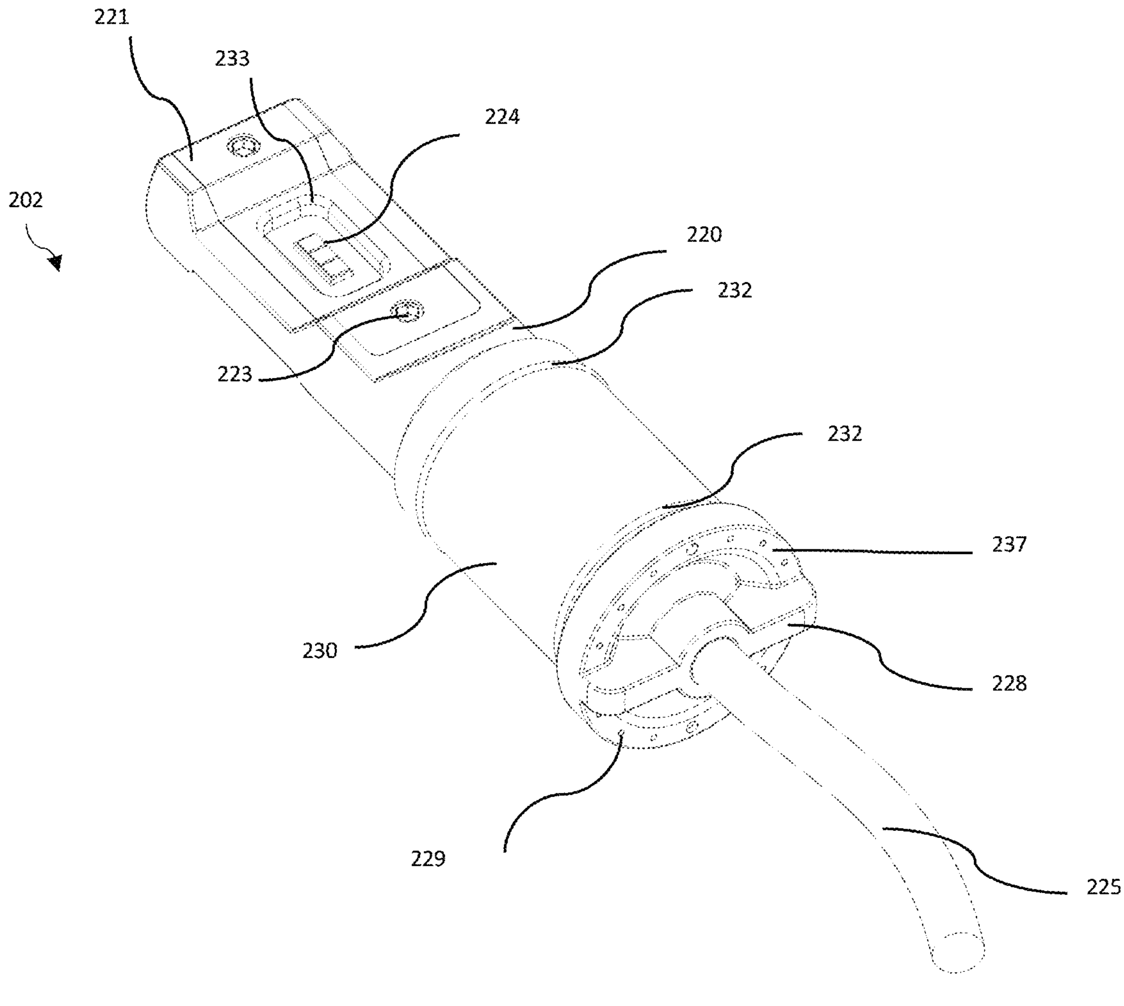

FIGS. 2A-2J schematically illustrate a light bulb 200 according to one embodiment of the present disclosure. Similar to the light bulb 100, the light bulb 200 also includes a bulb body assembly 202 rotatable relative to a mounting assembly 204. The bulb body assembly 202 may include a key portion 228 for easy rotation. FIGS. 2A and 2B are schematic rear perspective views of the light bulb 200. FIG. 2C is a schematic front perspective view of the light bulb 200. FIG. 2D is a rear perspective view of the light bulb 200 showing details of the key portion 228. FIG. 2E is a schematic exploded view of the light bulb 200. FIG. 2F is a schematic rear view of the light bulb 200. FIG. 2G is a schematic sectional view of the light bulb 200 along a line 2G-2G in FIG. 2F. FIG. 2H is a rear perspective view of the mounting assembly 204. FIG. 2I is a front perspective view of the mounting assembly 204. FIG. 2J is a rear perspective view of the bulb body assembly 202.

The bulb body assembly 202 includes one or more light sources and is configured to generate light beams. The mounting assembly 204 may include structures to mount the light bulb 200 on a lamp housing, such as a vehicle lamp housing. The bulb body assembly 202 and the mounting assembly 204 are connected by a rotatable joint 206 so that the bulb body assembly 202 is rotatable relative to the mounting assembly 204 when the mounting assembly 204 is mounted on a lamp housing so that position of the light sources in the bulb body assembly 202 is adjustable relative to the lamp housing with the light bulb 200 remaining mounted in the lamp housing.

The bulb body assembly 202 includes a rotatable body 220, a mounting plate 221, a light source circuit board 222 having one or more light sources 224, and a key portion 228. The light source circuit board 222 may be a printed circuit (PCB) board on which the one or more light sources 224 are installed. In some embodiments, the one or more light sources 224 may be one or more light-emitting (LED) diodes, laser diodes, or combinations thereof. The light source circuit board 222 may include drive circuits and/or control circuits to the one or more light sources 224. The light sources 224 are mounted on both a front side and a back side of the light source circuit board 222.

The rotatable body 220 may have a substantially elongated body having a front end 220*a* and a rear end 220*b* along a central axis 201. The rear end 220*b* may be a cylinder having an outer profile 230 to rotatably fit in the mounting assembly 204, and an inner volume 235. In some embodiments, one or more grooves 231 may be formed on the outer profile 230. One or more seal rings 232 may be disposed in the one or more grooves 231. The seal rings 232 prevent dusts, particles, vapor, or other environmental contaminations from entering the lamp housing through the rotatable joint 206 between the bulb body assembly 202 and the mounting assembly 204.

The front end 220*a* may have a planar shaped body extending along the central axis 201. The light source circuit board 222 may be attached to the rotatable body 220 at the front end 220*a*. The light source circuit board 222 may be fixedly attached to the rotatable body 220. In some embodiments, the mounting plate 121 to secure the light source circuit board 222. The mounting plate 221 is shaped to fit the front end 220*a* of the rotatable body 220. The light source circuit board 222 is secured to the rotatable body 220 by being sandwiched between the front end 220*a* of the rotatable body 220 and the mounting plate 221. The front end 220*a* may include a light opening 227. The mounting plate 221 may include a light opening 233. The light sources 224 disposed on front and back sides of the light source circuit board 222 are exposed from the rotatable body 220 and the mounting plate 221. In some embodiments, the light sources 224 on the back side and front side of the light source circuit board 222 may be symmetrically positioned about the central axis 201. The light source circuit board 222 may be mounted on the rotatable body 220 and the mounting plate 221 by any suitable means, for example by screws, pins, adhesives, keys and splines, or the like. In some embodiments, screws 223 are used to secure the light source circuit board 222.

In some embodiments, the rotatable body 220 and the mounting plate 221 may be formed from a material with good heat conductivity, such as aluminum, copper, steel, heat conductive polymer, and the like.

The key portion 228 is fixed attached to the rear end 220*b* of the rotatable body 220. In some embodiments, the key portion 228 is permanently attached to the rotatable body 220, for example by splines, screws, pins, adhesives, or the like. In some embodiments, the key portion 228 may have an end cap 237 to connect with the rear end 220*b* of the rotatable body 220 and a rib portion 238 extending from the end cap 237. The end cap 237 is fixedly attached to the rotatable body 220 and closes off the inner volume 235 in the rotatable body 220. In some embodiments, the end cap 237 may be a disk-shaped plate having a diameter greater than an outer diameter of the rotatable body 220 and form a shoulder 228*s* to prevent axial movement between the bulb body assembly 202 and the mounting assembly 204. The rib portion 238 may be shaped to facilitate easy turning of the bulb body assembly 202. In some embodiments, a plurality of dials 229 may be formed on the end cap 237 near an outer diameter. The plurality of dials 229 may function as visual aids when rotating the bulb body assembly 202 relative to the mounting assembly 204. In some embodiment, an opening 234 is formed through the key portion 228. A connection cord 225 may extend from the opening 234 to connect with the light source circuit board 222. The connection cord 225 may include two or more wires to connect the light source circuit board 222 with a power supply or control signals.

The mounting assembly 204 is configured to fixedly attach the light bulb 200 to a lamp housing. The mounting assembly 204 may be shaped according to corresponding design of the lamp housing. In some embodiments, the mounting assembly 204 may include a core portion 240, a heatsink portion 242, and a collar portion 243. The mounting assembly 204 may be formed in one piece or multiple pieces. In some embodiments, the mounting assembly 204 is formed from a material with good heat conductivity, such as aluminum, copper, steel, heat conductive polymer, and the like.

The heatsink portion 242 may include a plurality of cooling plates 242*a* extending from an outer diameter of the core portion 240. The cooling plates 242*a* may be shaped according to space permitted in particular applications. The collar portion 243 is formed at a front end 240*a* of the core portion 240. One or more tabs 243*a* are on the outer diameter of the collar portion 243. The one or more tabs 243*a* may match an opening through the lamp housing to allow the collar portion 243 to be inserted in the lamp housing during installation. After the collar portion 243 is inserted into the lamp housing, the mounting assembly 204 may be rotated relative to the lamp housing so that the lamp housing is secured between the collar portion 243 and the heatsink portion 242.

The core portion 240 has an inner profile 244 configured to receive the outer profile 230 of the bulb body assembly 202. Particularly, the inner profile 244 may be sized to match the outer profile 230 and the seal rings 232 of the rotatable body 220. The inner profile 244 of the core portion 240 and the outer profile 130 of the rotatable body 220 form the rotatable joint 206. The rotatable joint 206 allows the bulb assembly 202 to be securely attached to the mounting assembly 204 and rotatable about the central axis 201 when a torque is applied on the rotatable key portion 228. The outer profile 230 and the inner profile 244 are smooth surfaces in a cylindrical shape. A tolerance between diameters of the inner profile 244 and the outer profile 230 is selected to be in a range to for a rotatable fitting.

In some embodiments, the mounting assembly 204 may include a core portion 240, a heatsink portion 242, and a collar portion 243. The mounting assembly 204 may be formed in one piece or multiple pieces. In some embodiments, the mounting assembly 204 is formed from a material with good heat conductivity, such as aluminum, copper, steel, heat conductive polymer, and the like.

When assembled, the key portion 228 is disposed on the rear end 240*b* of the core portion 240. In some embodiments, the core portion 240 may include a step 240*s*. When the bulb body assembly 202 and the mounting assembly 204 are assembled, the step 240*s* on the core portion 240 abuts the shoulder 228*s* of the bulb body assembly 202, thus, preventing further axial movement of the bulb body assembly 202. In some embodiments, the core portion 240 includes one or more markings 241 at the rear end 240*b*. The markings 241 may be used together with the dials 229 on the rotatable key portion 228 to track the amount of rotation between the bulb body assembly 202 and the mounting assembly 204.

Figure 3A:
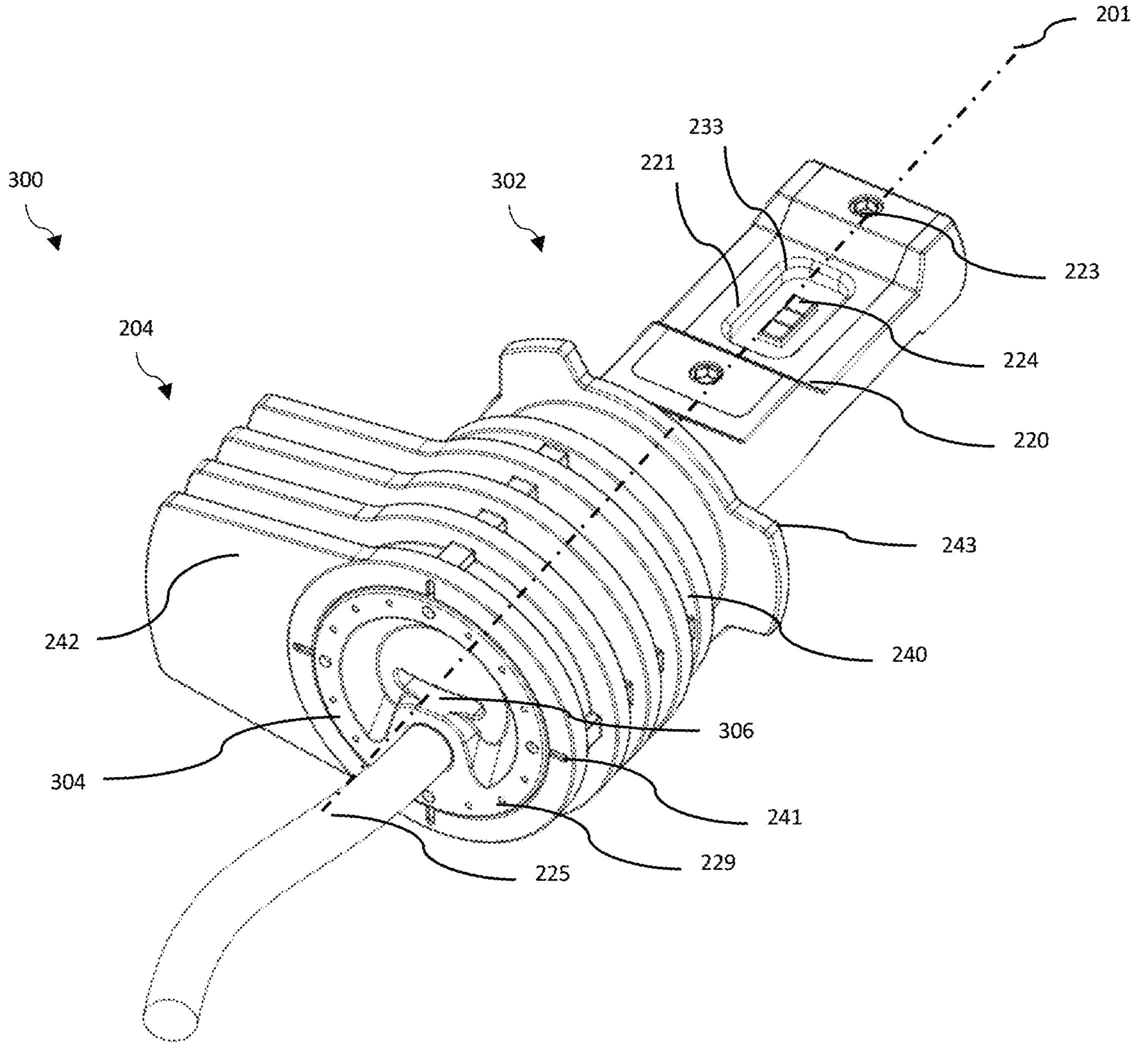
FIGS. 3A-3C schematically illustrate a light bulb according to one embodiment of the present disclosure.
Figure 3B:
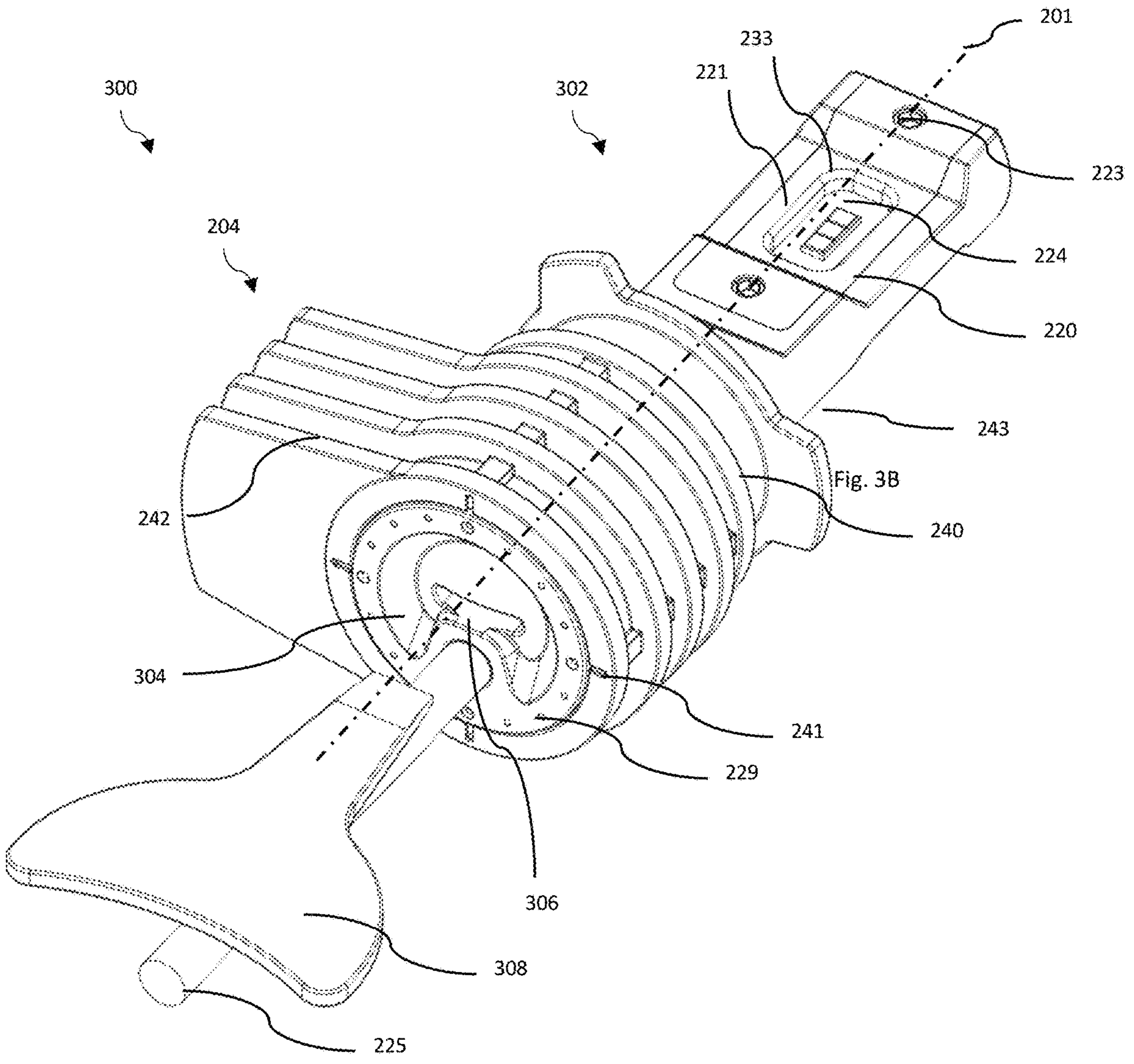
Figure 3C:
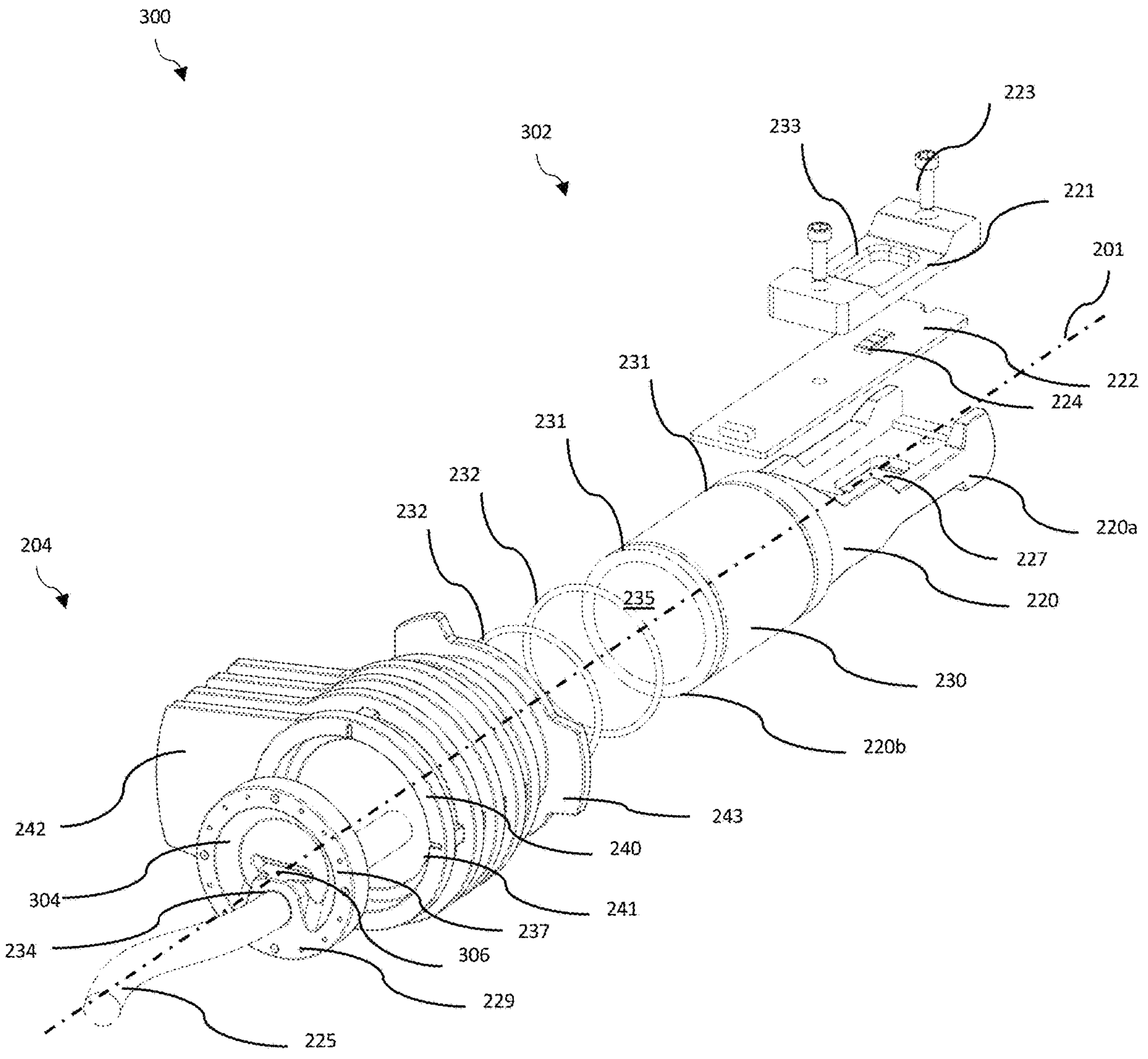

FIGS. 3A-3C schematically illustrate a light bulb 300 according to one embodiment of the present disclosure. The light bulb 300 is similar to the light bulb 200 except that the light bulb 300 includes a bulb body assembly 302 with a detachable key 308. FIG. 3A is a schematic perspective view of the light bulb 300 without the detachable key 308. FIG. 3B is a schematic perspective view of the light bulb 300 with the detachable key 308. FIG. 3C is a schematic exploded view of the light bulb 300. The bulb body assembly 302 includes an end cap 304 fixedly attached the rear end 220*b* of the rotatable body 220. The end cap 304 includes a tool slot 306 shaped to match the detachable key 308. In some embodiments, the tool slot 306 may be positioned on the central axis 201. The opening 234 may be disposed off-set the central axis 201. Alternatively, the tool slot 306 may be positioned at any suitable position. In some embodiments, the tool slot 306 may have a customized shape to fit particularly with the detachable key 308. The customized shape may limit unintentional rotation of the bulb body assembly 302. In other embodiments, the tool slot 306 may be shaped to receive a standard tool, such as a flat-head screwdriver, a crosshead screwdriver, an Allen wrench, or the like.

The detachable key 308 may be inserted into the tool slot 306 to rotate the bulb body assembly 302 relative to the mounting assembly 204. After the light bulb 300 is installed, the detachable key 308 may be removed. By using a detachable key 308, the light bulb 300 may be flexibly installed without occupying extra spaces.

Figure 4A:
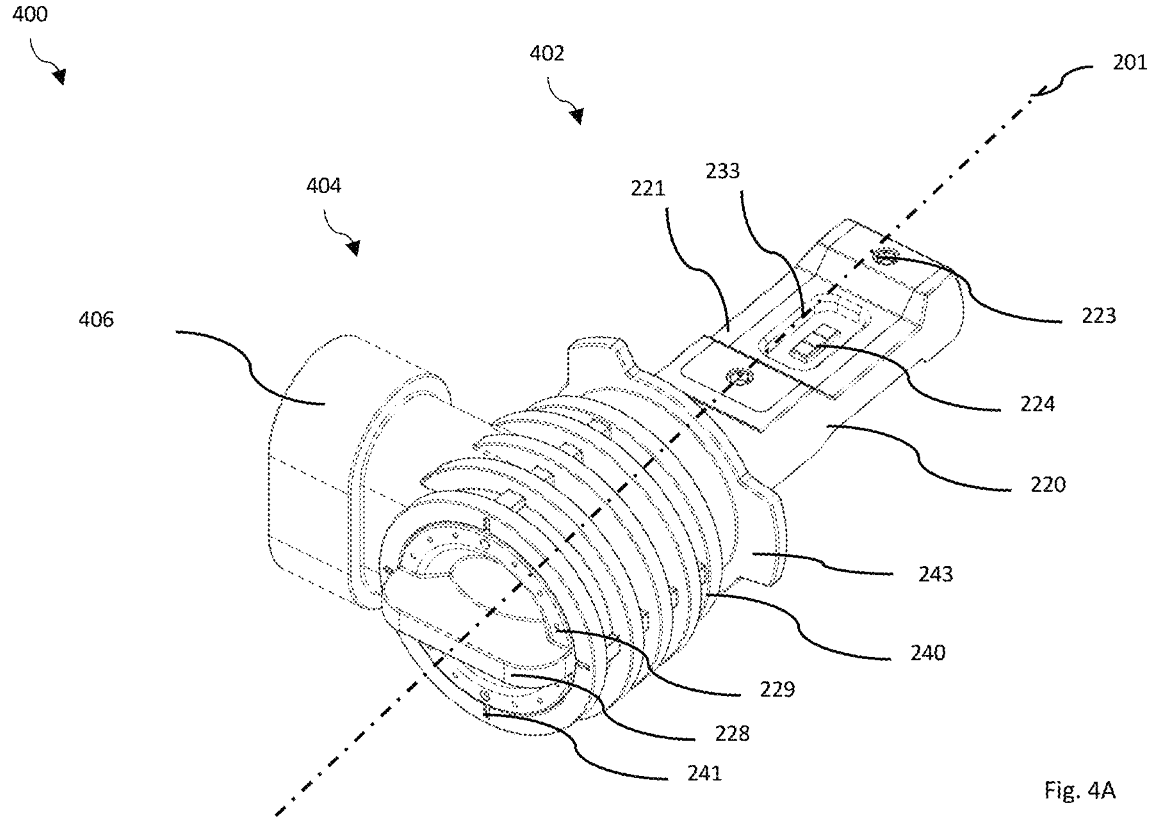
FIGS. 4A-4F schematically illustrate a light bulb according to one embodiment of the present disclosure.
Figure 4B:
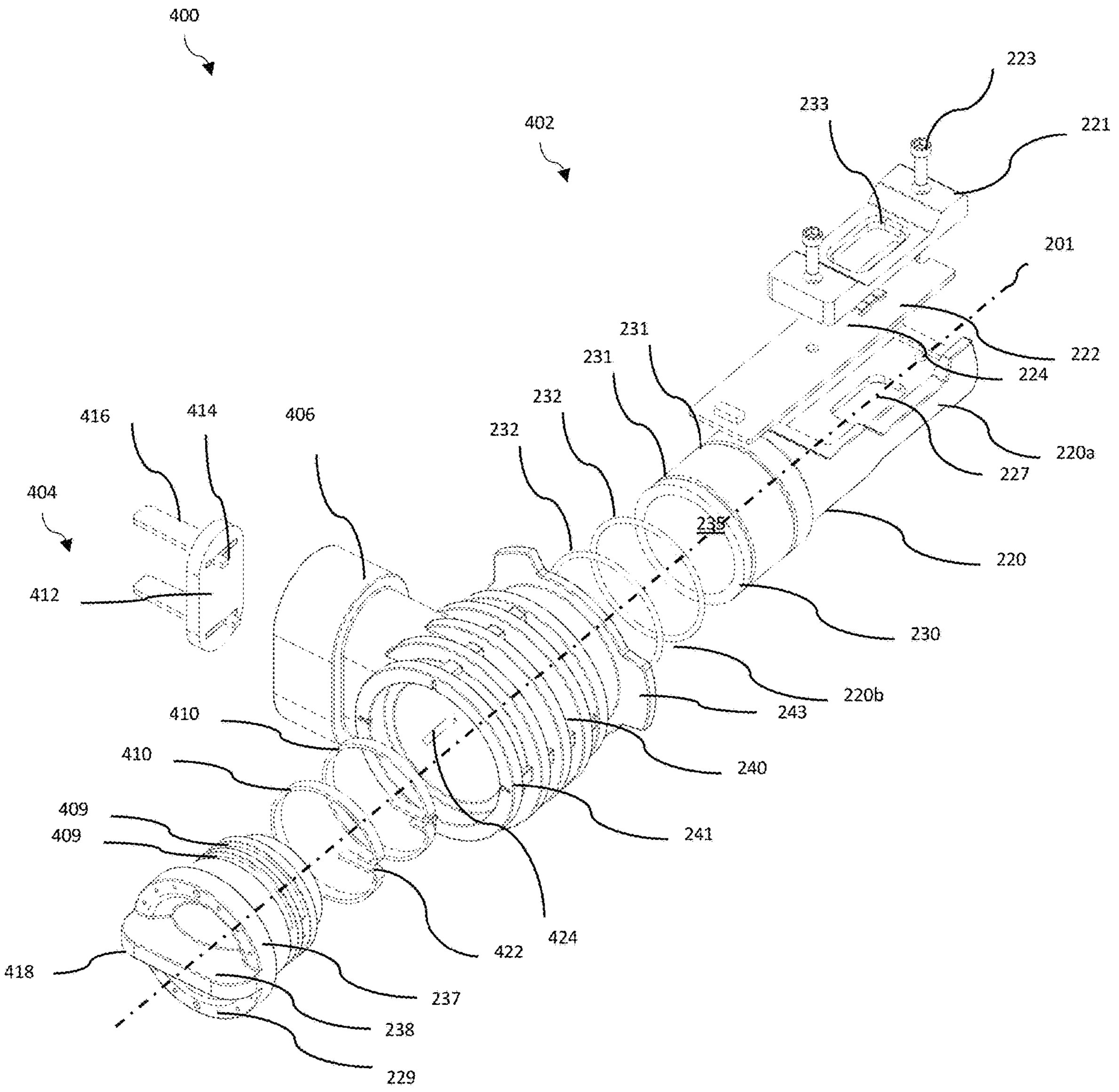
Figure 4C:
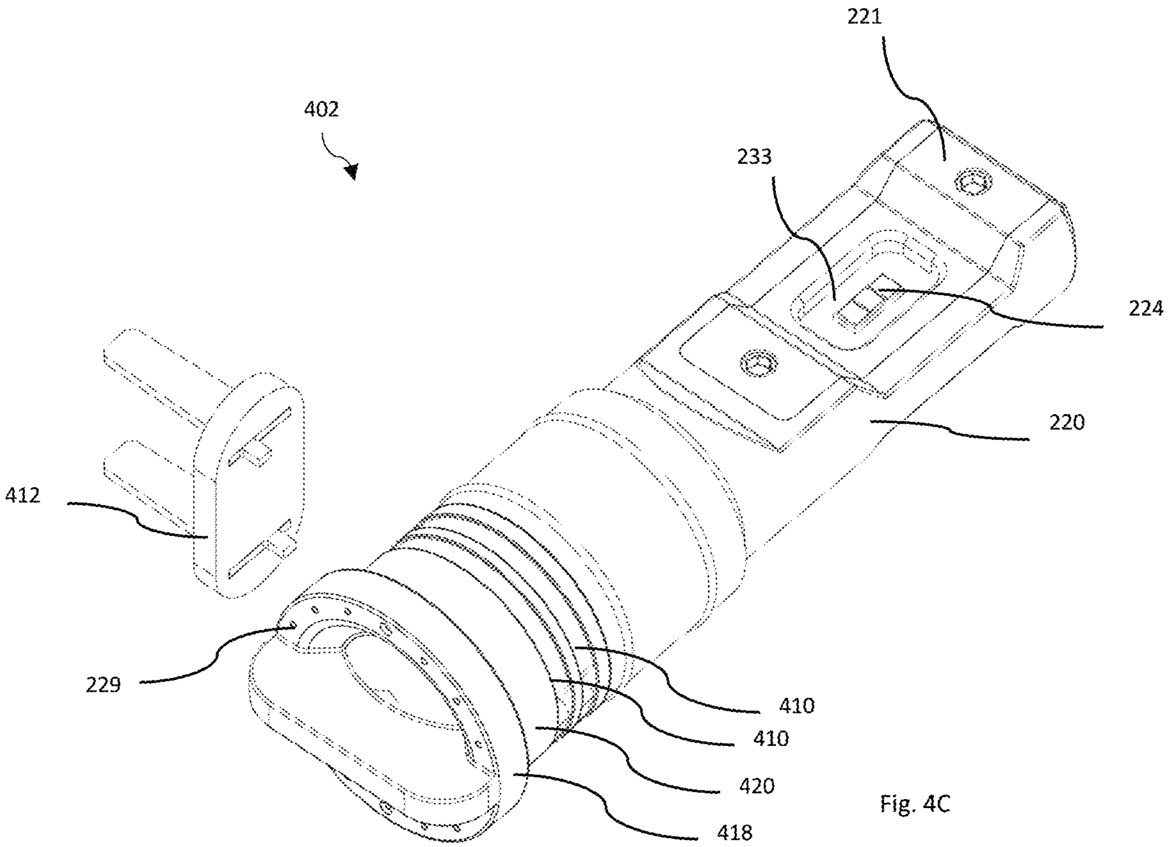
Figure 4D:
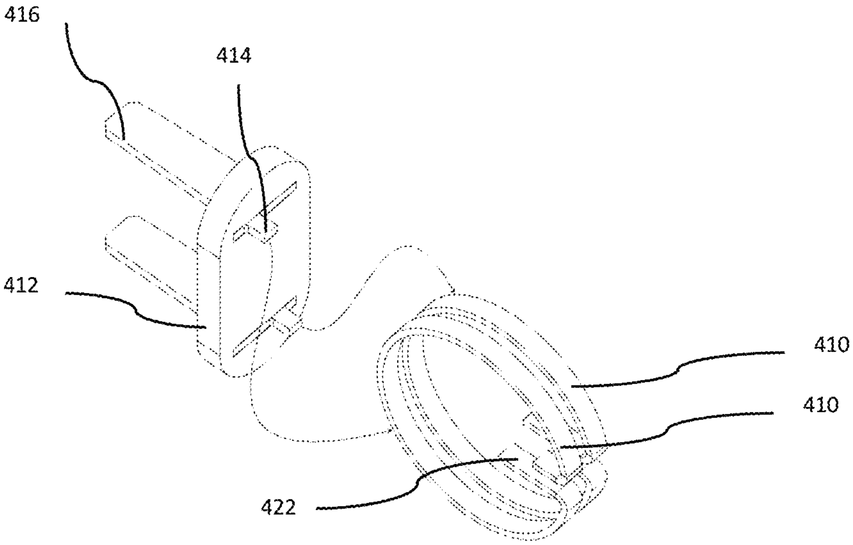
Figure 4E:
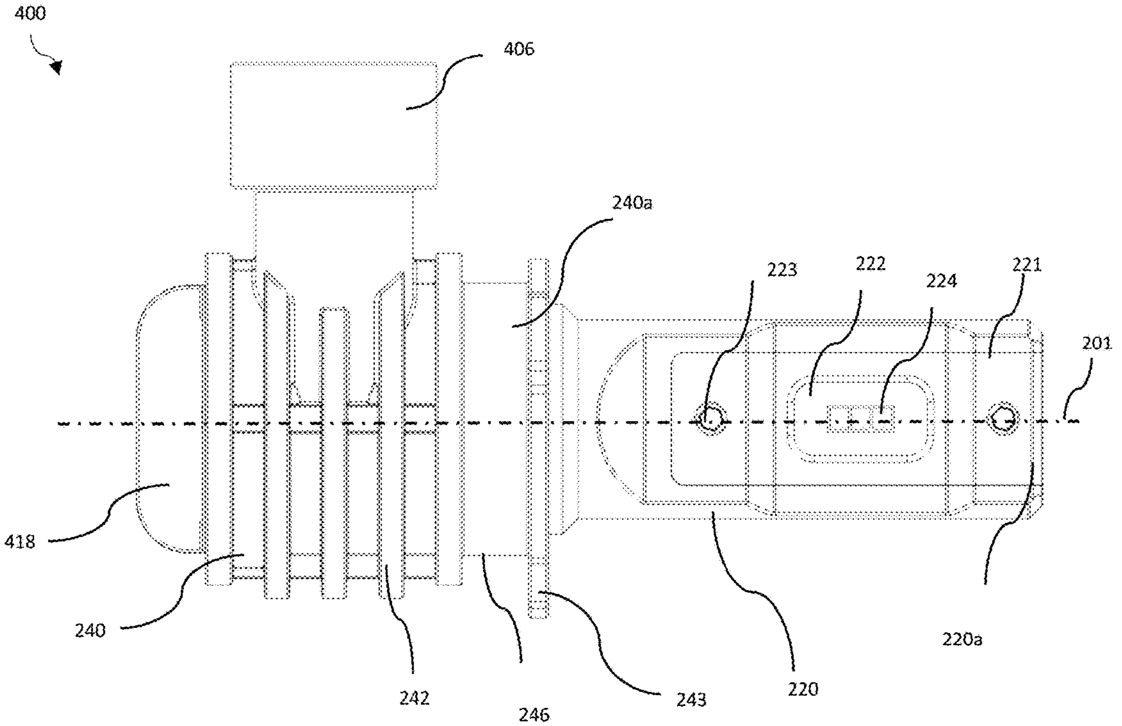
Figure 4F:
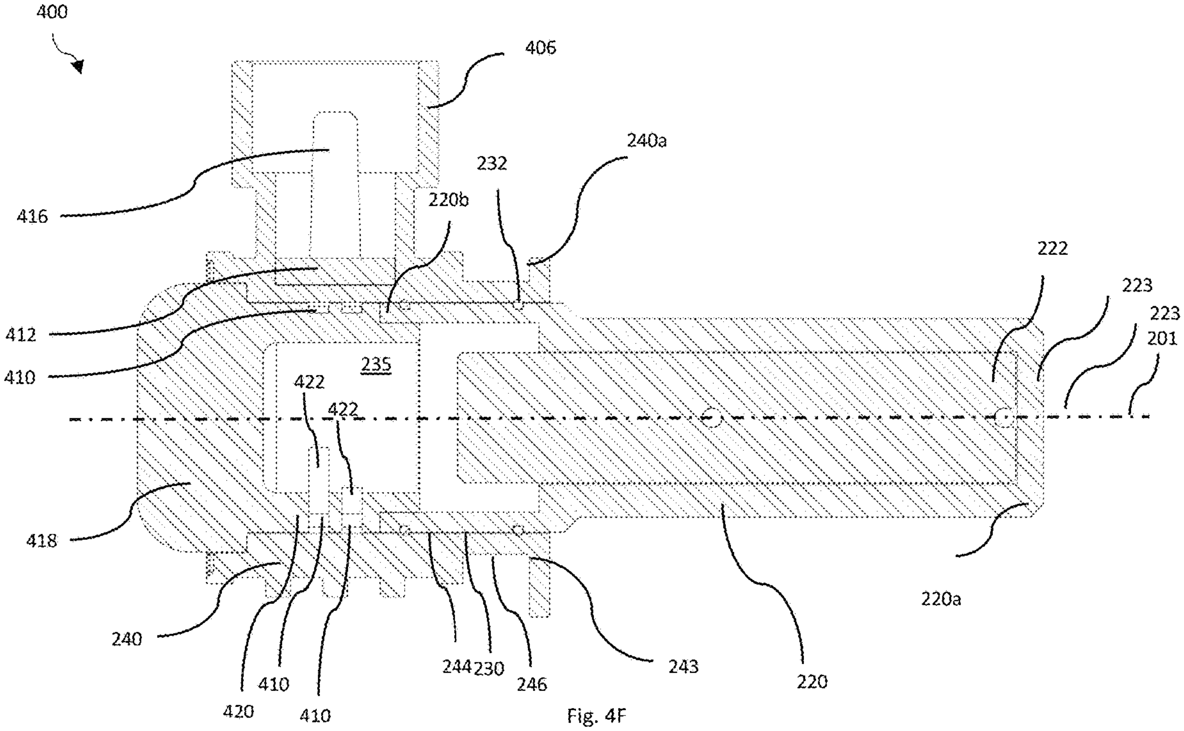

FIGS. 4A-4F schematically illustrate a light bulb 400 according to one embodiment of the present disclosure. Similar to the light bulbs 100, 200 and 300, the light bulb 400 also includes a bulb body assembly 402 rotatable relative to a mounting assembly 404. FIG. 4A is a rear perspective view of the light bulb 400. FIG. 4B is a schematic exploded view of the light bulb 400. FIG. 4C is a schematic rear perspective view of the bulb body assembly 402 relative to a power connector disposed in the mounting assembly 404. FIG. 4D is a schematic view showing electrical connection between the bulb body assembly 402 and the mounting assembly 404. FIG. 4E is a schematic top view of the light bulb 400. FIG. 4F is a schematic sectional view of the light bulb 400.

The light bulb 400 is similar to the light bulb 200 except that there is an electrical connection between the mounting assembly 404 and the bulb body assembly 402. The bulb body assembly 402 includes a key portion 418 fixed attached to the rear end 220*b* of the rotatable body 220. In some embodiments, the key portion 418 may have an end cap 237, an electric insert portion 420 extending from a front side of the end cap 237, and a rib portion 238 extending from a rear side of the end cap 237. The electric insert portion 420 is attached to the rear end 220*b* of the rotatable body 220. The electric insert portion 420 may include two grooves 409 formed on an outer diameter. Two connection rings 410 are disposed in the grooves 409 formed in the electric insert portion 420. Each connection ring 410 has one end 422 extending into the inner volume 235 via through holes formed through the electric insert portion 420. The connection rings 410 are electric conductors. The ends 422 are electrically connected to the light source circuit board 222 to provide power or control signal to the light sources 224.

The mounting assembly 404 is configured to fixedly attach the light bulb 400 to a lamp housing. The mounting assembly 404 may be shaped according to corresponding design of the lamp housing. In some embodiments, the mounting assembly 404 may include the core portion 240, the heatsink portion 242, the collar portion 243, and a power connector housing 406. The power connector housing 406 may extend from the core portion 240. A power adaptor 412 is disposed in the power connector housing 406. The power adaptor 412 may include two connection prongs 416. Each connection prong 416 has an end 414 extending through a through hole 424 formed through the core portion 240 to contact one of the connection rings 410 on the bulb body assembly 402. When assembled, the key portion 418 can be used to rotate the bulb body assembly 402 relative to the mounting assembly 404. During the rotation, the connection prongs 416 maintains contact with the connection rings 410 at the ends 414.

Figure 5A:
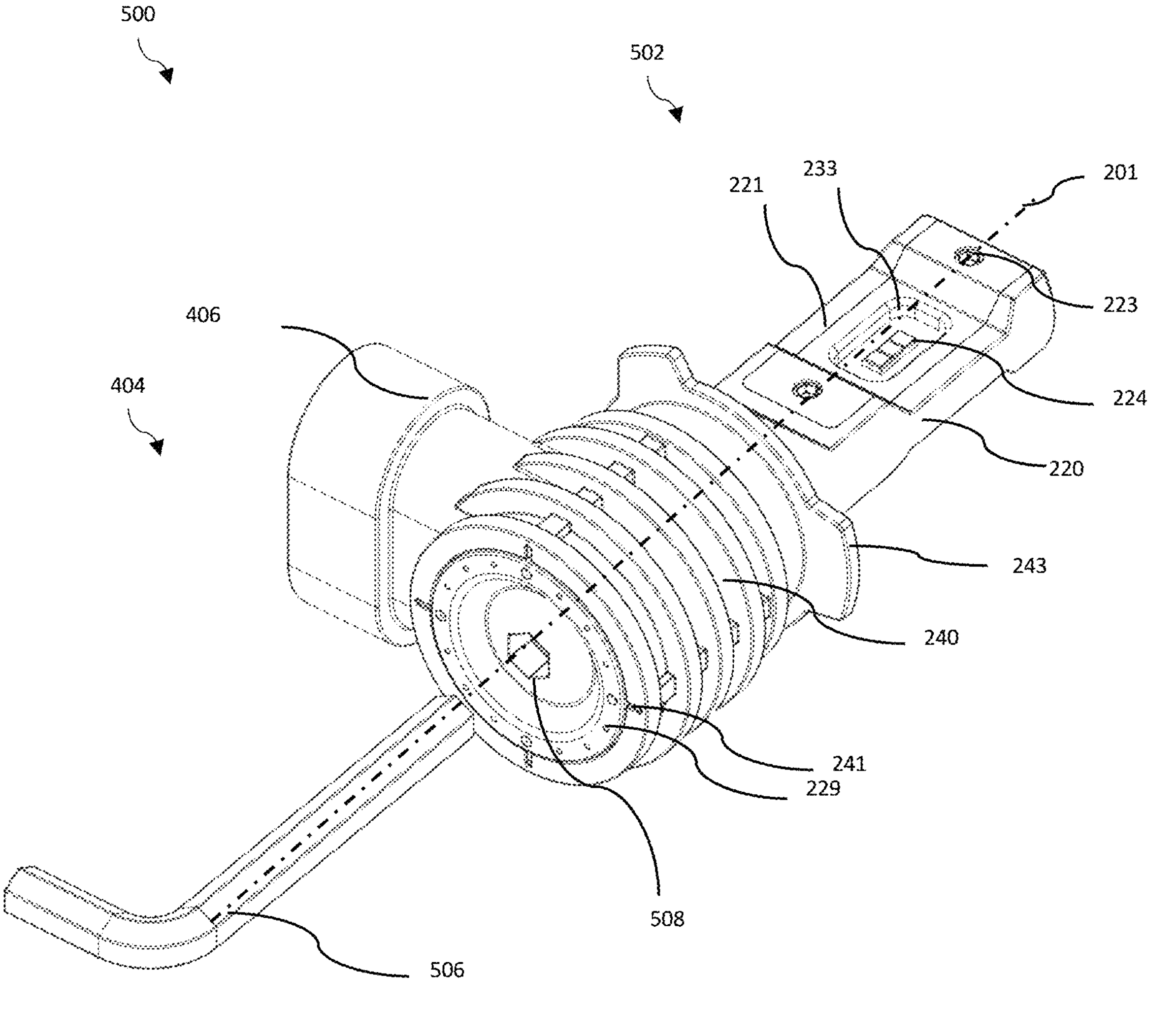
FIGS. 5A-5B schematically illustrate a light bulb according to one embodiment of the present disclosure.
Figure 5B:
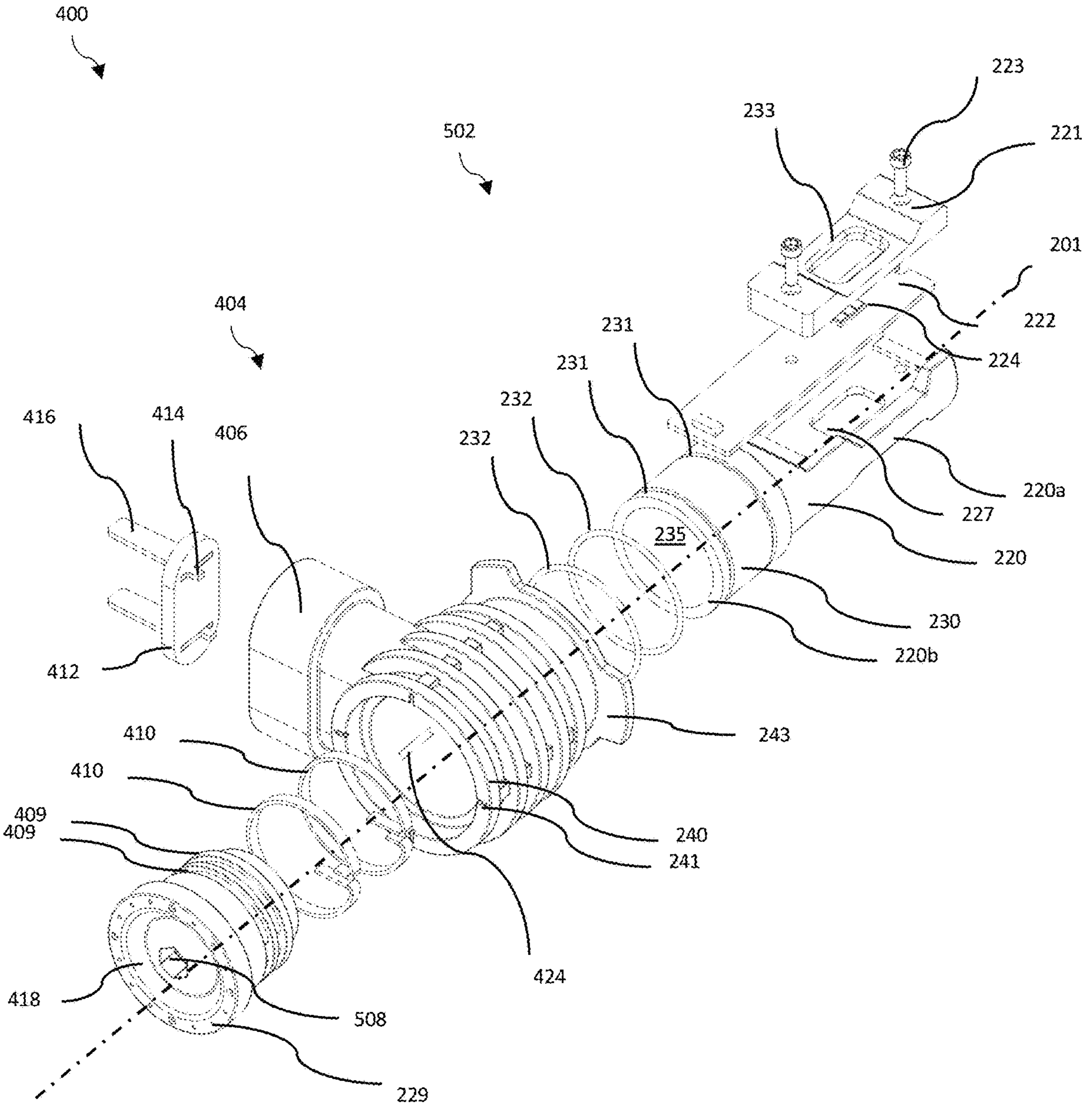

FIGS. 5A-5B schematically illustrate a light bulb 500 according to one embodiment of the present disclosure. The light bulb 500 is similar to the light bulb 400 except that the light bulb 500 includes a bulb body assembly 502 may be rotated relative to the mounting assembly 404 using a standard tool 508. FIG. 5A is a schematic perspective view of the light bulb 500. FIG. 5B is a schematic exploded view of the light bulb 500. The bulb body assembly 502 includes a tool slot 506 shaped to match the standard tool 508. Even though the tool slot 506 is shown to match an Allen wrench, the tool slot 506 may be shaped to match any standard tool or specialized tools.

Figure 6A:
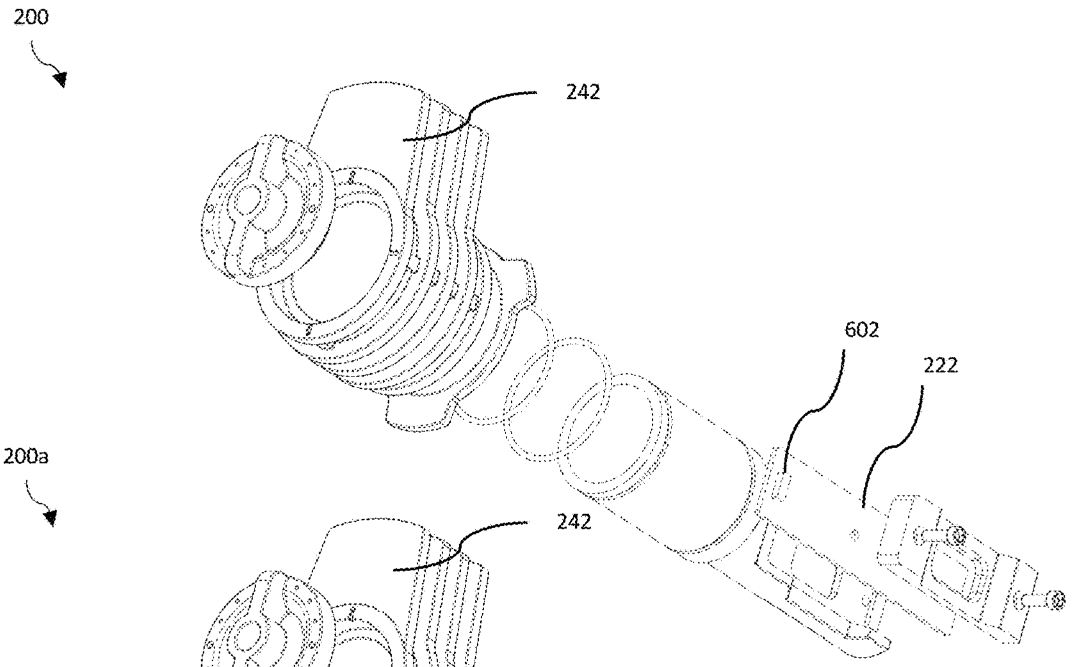
FIGS. 6A-6C schematically illustrate light source circuit board designs according to embodiments of the present disclosure.
Figure 6B:
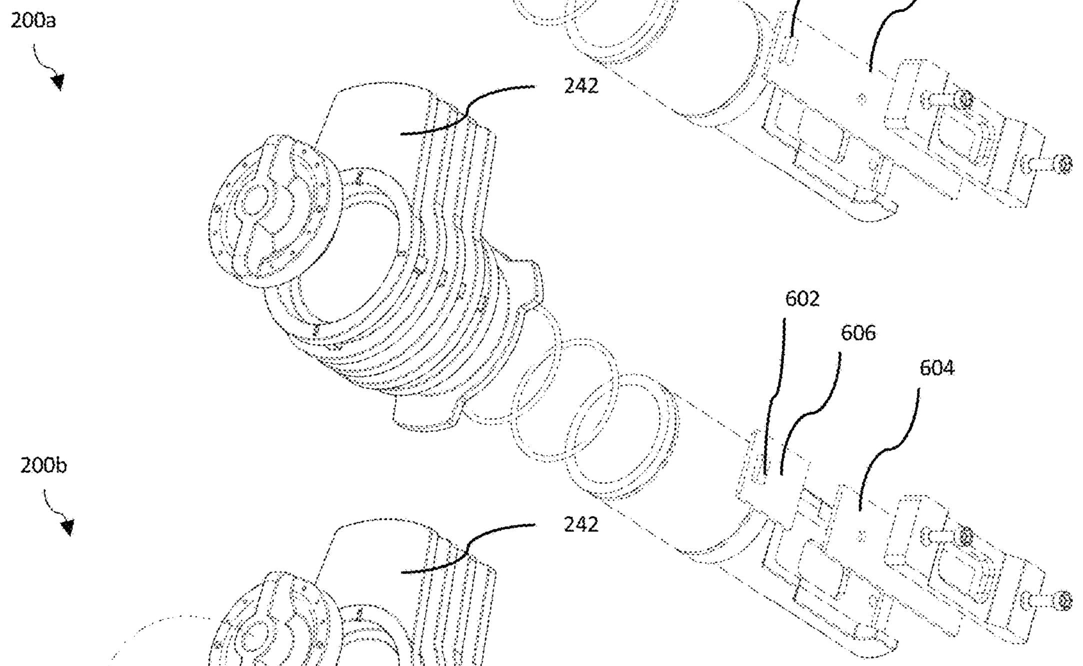
Figure 6C:
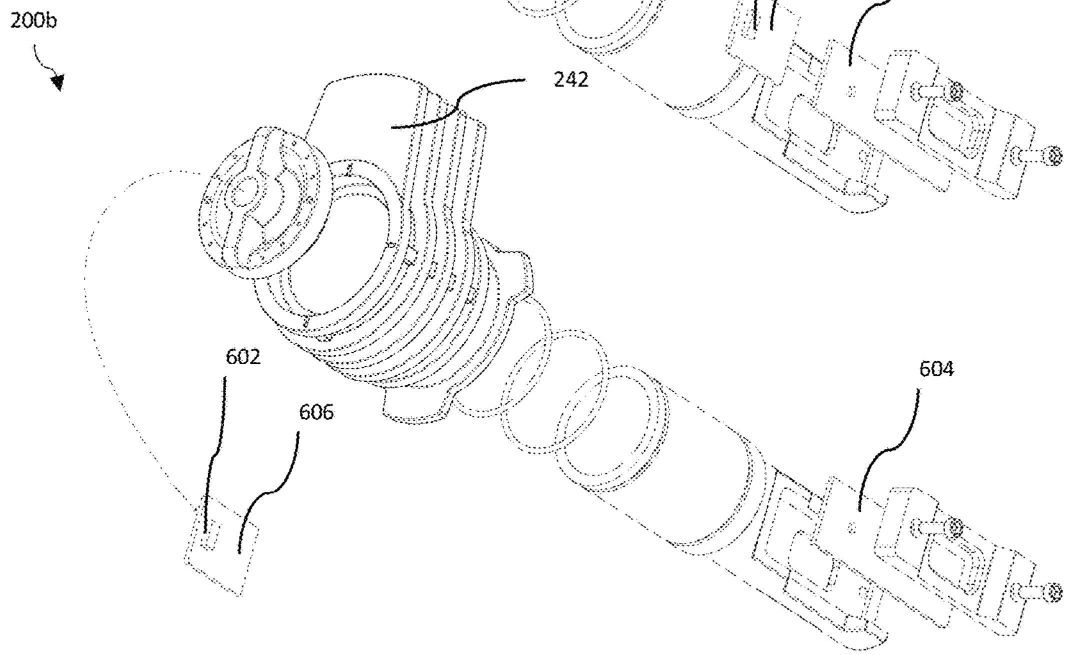

FIGS. 6A-6C schematically illustrate light source circuit board designs according to embodiments of the present disclosure. FIG. 6A is a schematic exploded view of the light bulb 200. The light bulb 200 includes one single light source circuit board 222. The light sources 224 and drive circuit 602 are disposed on the light source circuit board 222. When assembled, the drive circuit 602 is positioned adjacent the heatsink portion 242.

FIG. 6B is a schematic exploded view of a light bulb 200*a*. The light bulb 200 includes the light source circuit board 222 and a drive circuit board 604. The light sources 224 are disposed on the light source circuit board 222. The drive circuit 602 is disposed on the drive circuit board 604. When assembled, the drive circuit board 604 may be disposed close to the heatsink portion 242 to improve heat dissipation.

FIG. 6C is a schematic exploded view of a light bulb 200*b*. The light bulb 200*b* includes the light source circuit board 222 and the drive circuit board 604. The light sources 224 are disposed on the light source circuit board 222. The drive circuit 602 is disposed on the drive circuit board 604. When assembled, the drive circuit board 604 is disposed outside the light bulb 200*b*, for example in a location with a different heatsink.

Figure 7A:
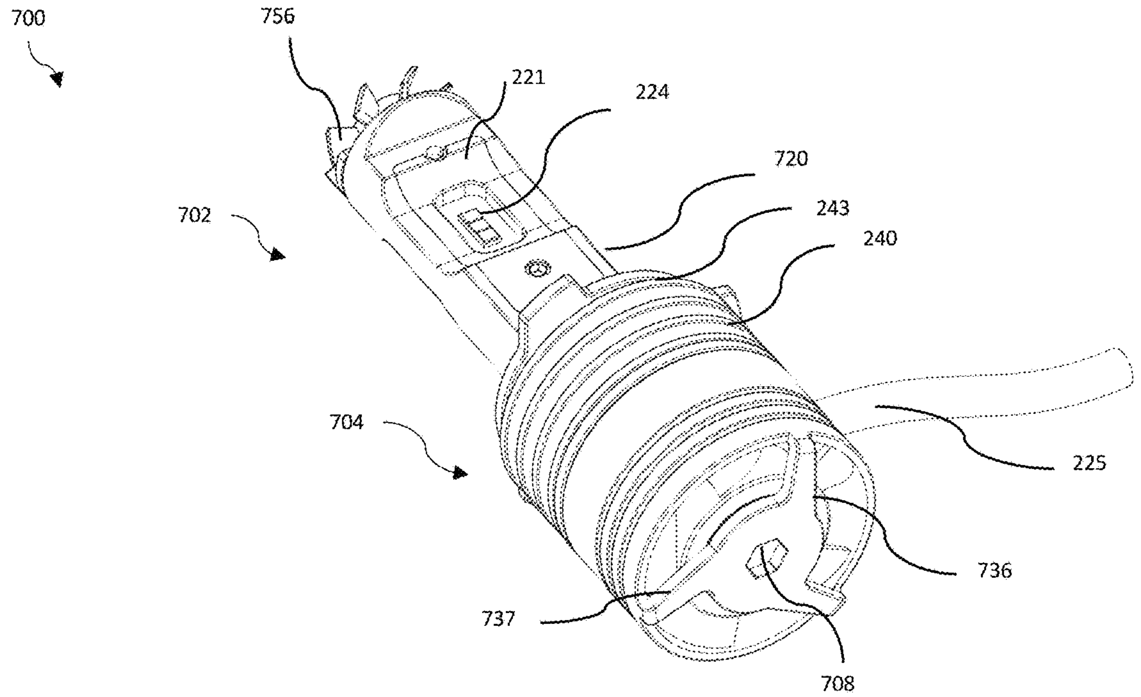
FIGS. 7A-7J schematically illustrate a light bulb according to one embodiments of the present disclosure.
Figure 7B:
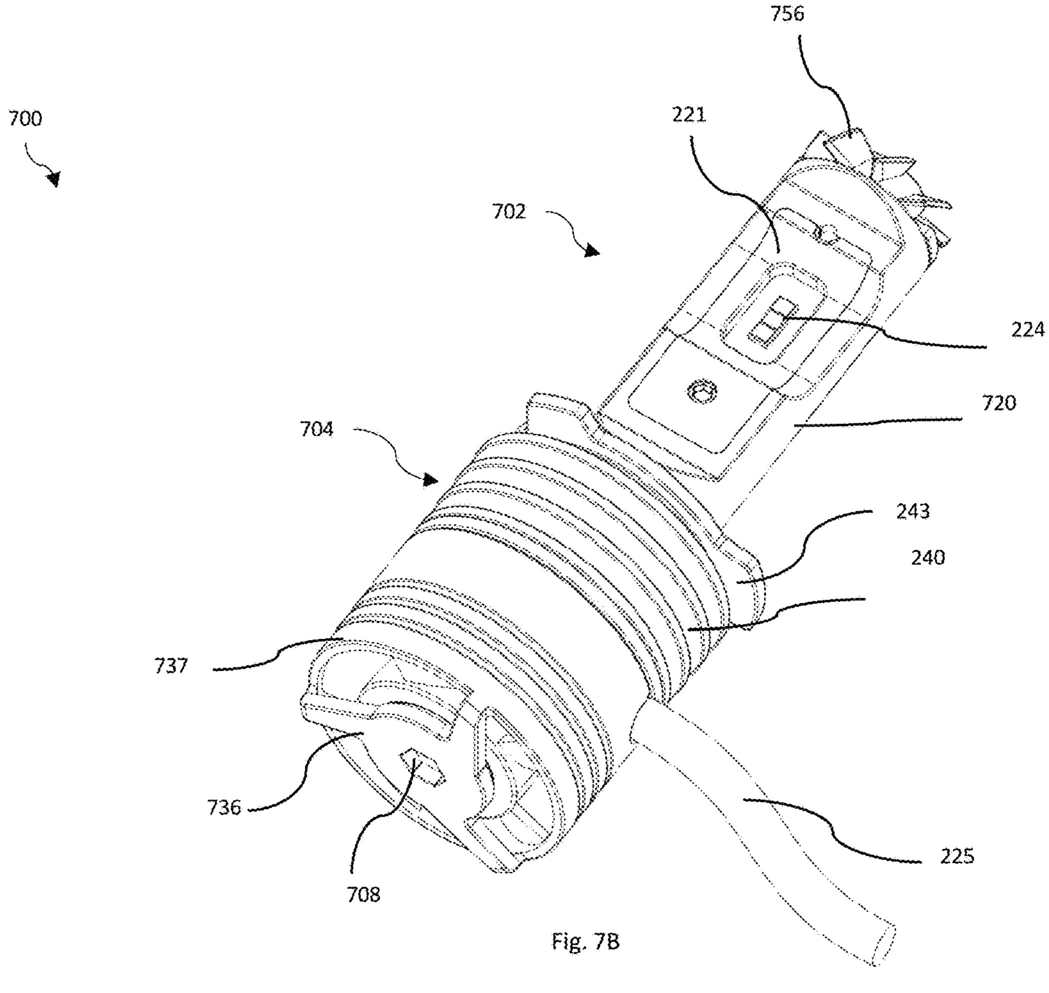
Figure 7C:
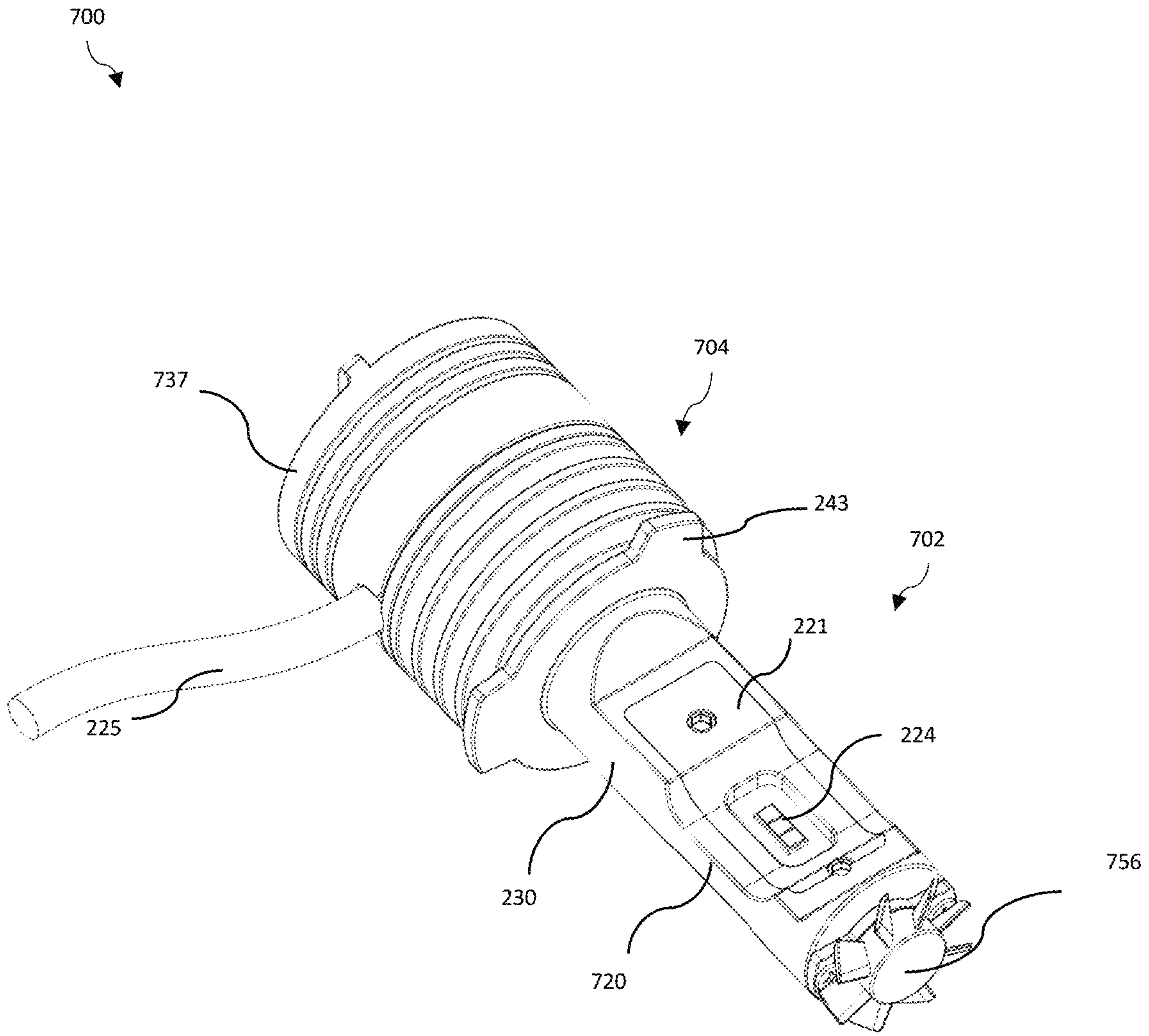
Figure 7D:
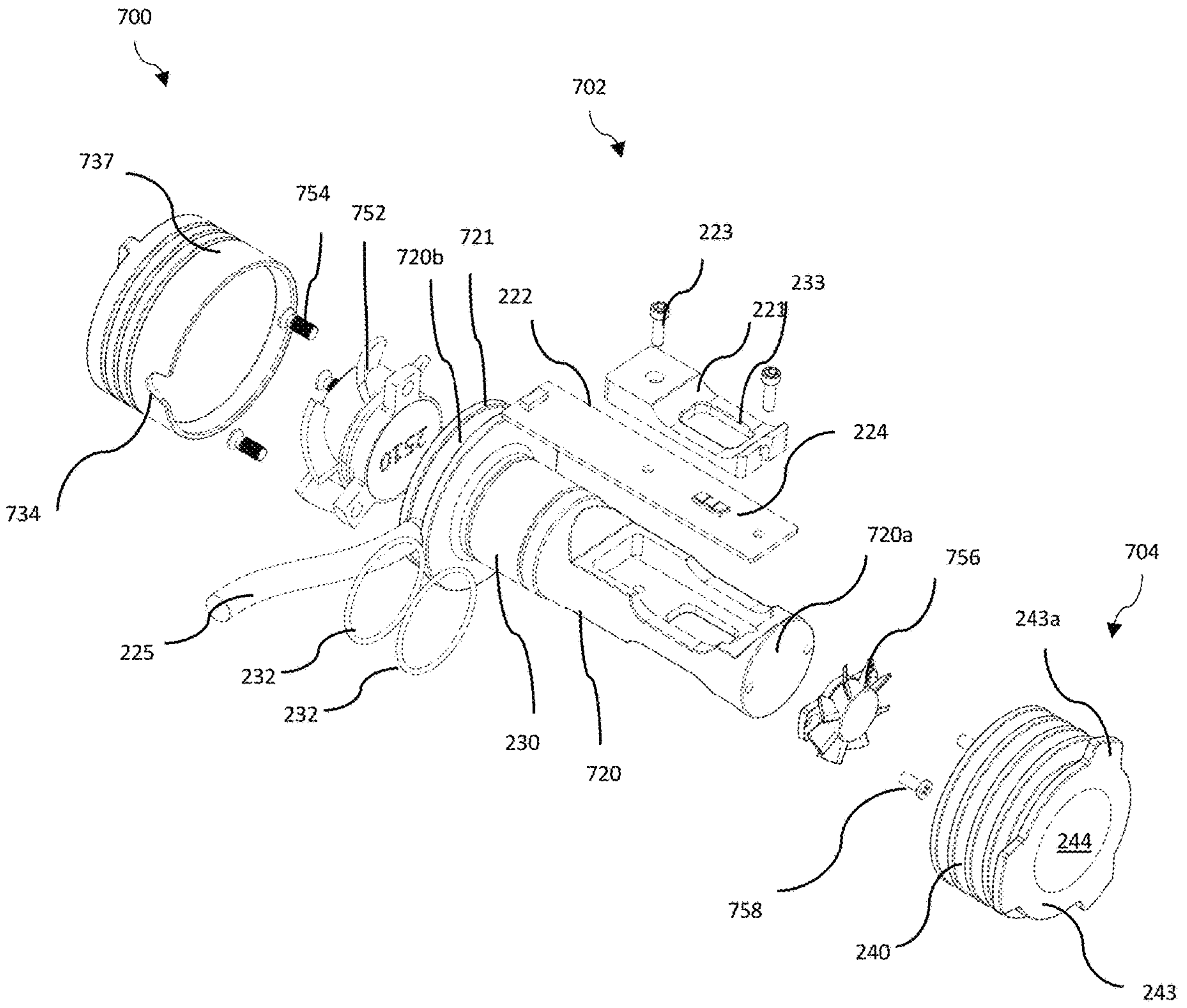
Figure 7E:
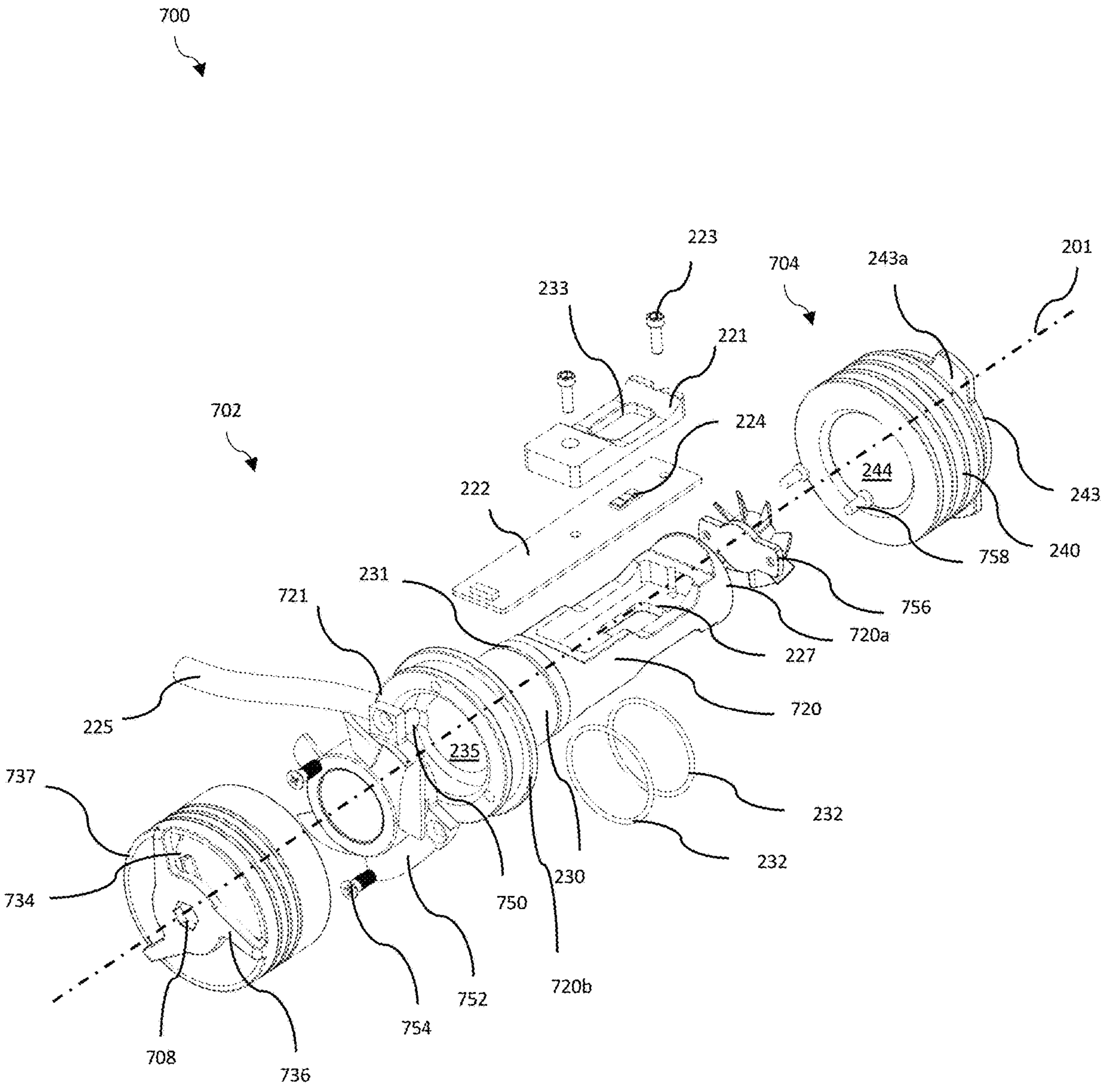
Figure 7F:
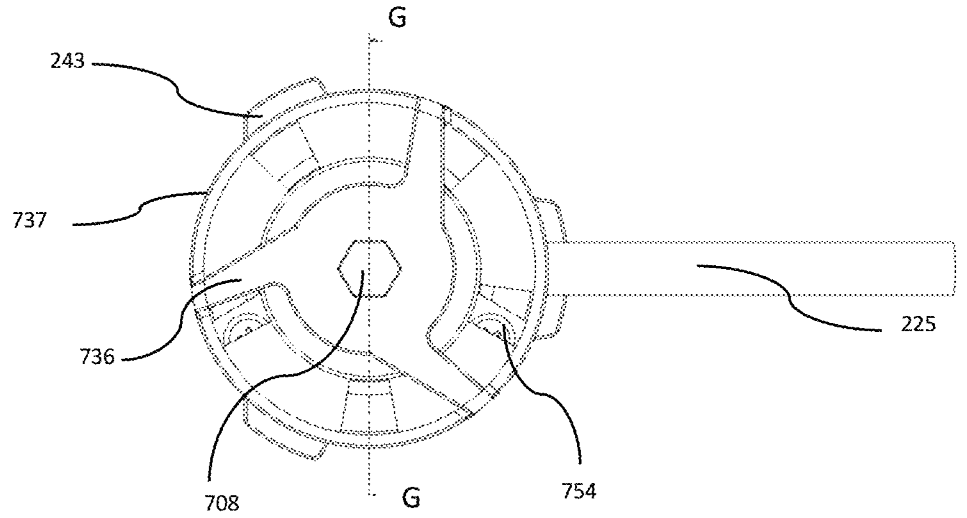
Figure 7G:
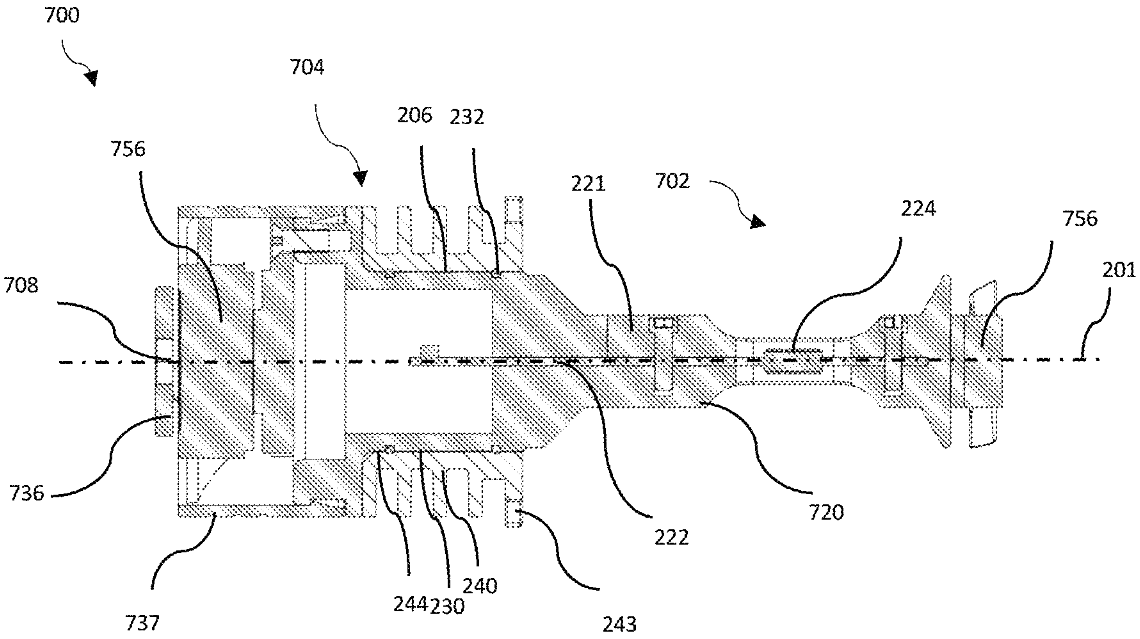
Figure 7H:
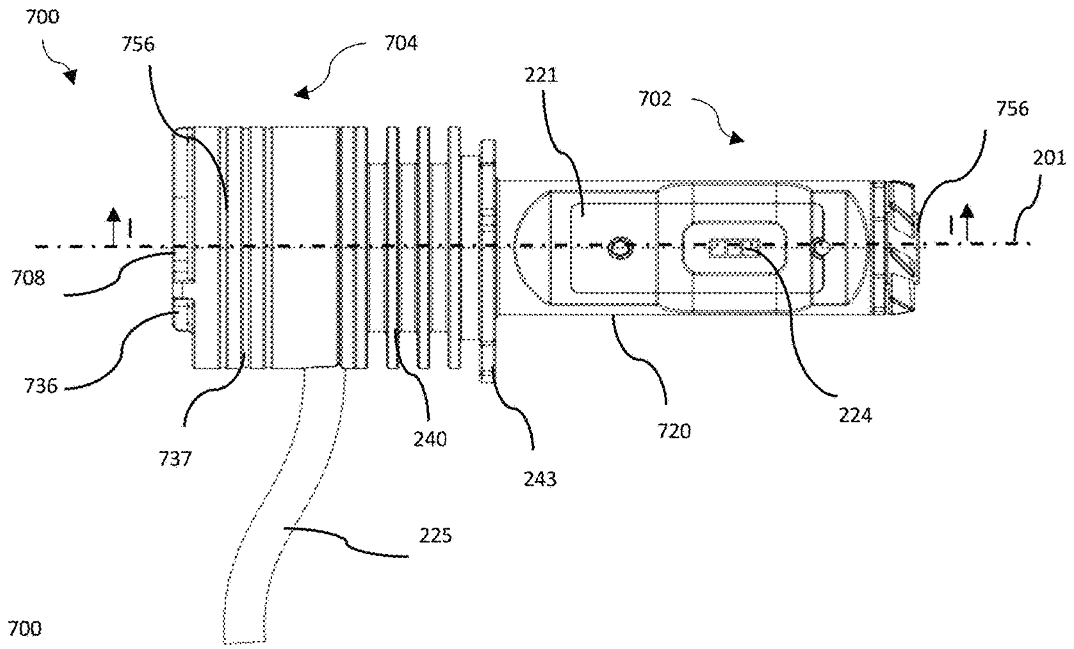
Figure 7I:
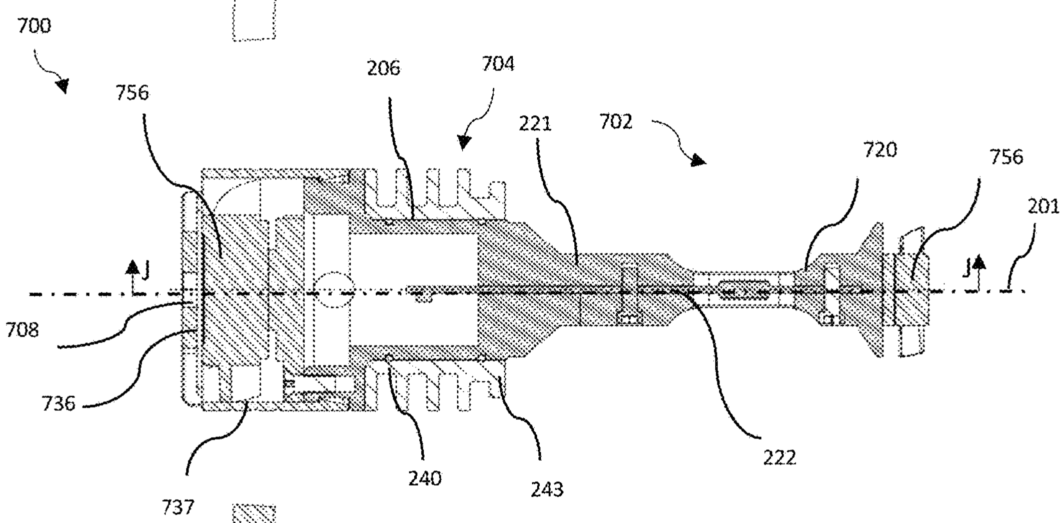
Figure 7J:
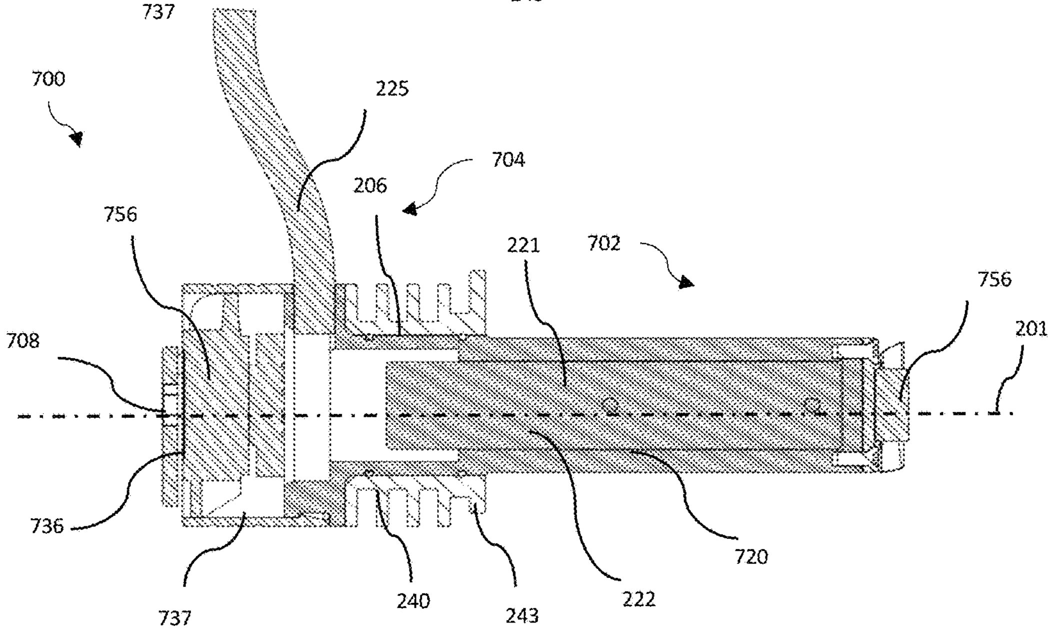

FIGS. 7A-7J schematically illustrate a light bulb 700 according to one embodiments of the present disclosure. Similar to the light bulbs 100, 200, 300, 400, and 500, the light bulb 700 also includes a bulb body assembly 702 rotatable relative to a mounting assembly 704. The bulb body assembly 702 may include one or more cooling fans. FIGS. 7A and 7B are schematic rear perspective views of the light bulb 700. FIG. 7C is a schematic front perspective view of the light bulb 700. FIGS. 7D and 7E are schematic exploded views of the light bulb 700. FIG. 7F is a schematic rear view of the light bulb 700. FIG. 7G is a schematic sectional view of the light bulb 700 along a line G-G in FIG. 7F. FIG. 7H is a schematic side view of the light bulb 700. FIG. 7I is a schematic sectional view of the light bulb 700 along a line I-I in FIG. 7H. FIG. 7J is a schematic sectional view of the light bulb 700 along a line J-J in FIG. 7I.

The bulb body assembly 702 includes the one or more light sources 124 and is configured to generate light beams. The mounting assembly 704 may include structures to mount the light bulb 700 on a lamp housing, such as a vehicle lamp housing. The bulb body assembly 702 includes and the mounting assembly 704 are connected by the rotatable joint 206 so that the bulb body assembly 702 is rotatable relative to the mounting assembly 704 when the mounting assembly 704 is mounted on a lamp housing so that position of the light sources 124 in the bulb body assembly 702 is adjustable relative to the lamp housing with the light bulb 700 remaining mounted in the lamp housing. The bulb body assembly 702 has the outer profile 230 matches with the inner profile 244 of the mounting assembly 704 to form the rotatable joint 206.

The bulb body assembly 702 is similar to the bulb assembly 502 in the light bulb 500 except the bulb body assembly 702 includes a rotatable body 720, a front cooling fan 756, a rear cooling fan 752, and an end cap 737 attached to a rear end 720*b*. The end cap 737 may cover the rear cooling fan 752 and have a tool slot 708. The tool slot 708 may receive a tool, such as a standard hand tool to rotate the bulb body assembly 702. Even though two cooling fans 752, 756 are shown in the light bulb 700. The rear cooling fan 752 or the front cooling fan 756 may be omitted according to the cooling needs.

The front cooling fan 756 may be positioned near a front end 720*a* of the rotatable body 720 and configured to provide cooling to the light sources 124. In some embodiments, the front cooling fan 756 may be attached to the front end 720*a* of the rotatable body 720 along the central axis 201. In some embodiments, the front cooling fan 756 may be attached to the rotatable body 720 by screws 758, or any suitable means, such as adhesive, threaded connection, etc. In some embodiments, the front cooling fan 756 may be powered and controlled via circuits on the light source circuit board 222.

The rear cooling fan 752 may be positioned near a rear end 720*b* of the rotatable body 720. In some embodiments, the rotatable body 720 may include an end portion 721 at the rear end 720*b*. The end portion 720 has a diameter greater than the outer profile 230. In some embodiments, the rear cooling fan 752 may be attached to the end portion 721 along the central axis 201. In some embodiments, the rear cooling fan 752 may be attached to the end portion by screws 754, or any suitable means, such as adhesive, threaded connection, etc. In some embodiments, the end portion 721 may include a cord opening 750 through which the connection cord 225 is threaded. In some embodiments, the rear cooling fan 752 may be powered and controlled via circuits on the light source circuit board 222 or directly by the connection cord 225.

The end cap 737 may be fixedly attached to the end portion 721 and cover the rear cooling fan 752. In some embodiments, the end cap 737 and the end portion 721 are clipped on together. In some embodiments, the end cap 737 has a cylindrical shape. Alternatively, the end cap 737 may be any shapes for functional or design purposes. In some embodiments, the end cap 737 may include a cord opening 734. When assembled, the cord opening 734 on the end cap 737 and the cord opening 750 of the end portion 721 align with each other to allow passage of the connection cord 225.

The tool slot 708 is formed at the end cap 737 to enable rotation of the bulb body assembly 704 using a matching tool. In some embodiments, one or more ribs 736 may form on the end cap 737. The ribs 736 may be used as a turning key to rotate the bulb body assembly 704 by hand.

The mounting assembly 704 is configured to fixedly attach the light bulb 700 to a lamp housing. The mounting assembly 704 may be shaped according to corresponding design of the lamp housing. Because one or two cooling fans 752, 756 are present in the light bulb 700, the mounting assembly 704 may be formed without a pronounced heatsink thus, be compact in dimension. For example, the mounting assembly 704 may include the core portion 240 and the collar portion 243.

Embodiments of the present disclosure provide a light bulb. The light bulb comprises a bulb body assembly comprising: a light source circuit board includes one or more light sources; an elongated body having a first end and a second end, wherein the light source circuit board is fixedly attached to the first end of the elongated body, and the second end has a cylindrical outer profile; and a key portion attached to the second end of the elongated body; and a mounting assembly comprising: a core portion having a cylindrical inner profile, wherein the second end of the elongated body of the bulb body assembly is disposed in the core portion so that the cylindrical outer profile of the elongated body and the cylindrical inner profile form a rotatable joint, and the bulb body assembly is rotatable relative to the mounting assembly by turning the key portion.

Embodiments of the present disclosure provide a method for installing a vehicle light. The method comprises providing a light bulb comprising: a bulb body assembly comprising a light source circuit board includes one or more light sources; an elongated body having a first end and a second end, wherein the light source circuit board is fixedly attached to the first end of the elongated body, and the second end has a cylindrical outer profile; and a key portion attached to the second end of the elongated body; a mounting assembly comprising: a core portion having a cylindrical inner profile, wherein the second end of the elongated body of the bulb body assembly is disposed in the core portion so that the cylindrical outer profile of the elongated body and the cylindrical inner profile form a rotatable joint; inserting a portion of the light bulb assembly into a lamp housing; mounting the mounting assembly of the light bulb the lamp housing; and rotating the key portion to adjust position of the one or more light sources relative to the lamp housing.

While the foregoing is directed to embodiments of the present disclosure, other and further embodiments of the disclosure may be devised without departing from the basic scope thereof.

The invention claimed is:

1. A light bulb, comprising:

a rotatable body having a first end, a second end opposing the first end, and an outer profile;

one or more light sources attached to near the first end of the rotatable body;

a mounting frame having a mounting feature and an inner profile, wherein the mounting feature is configured to secure a lamp housing, and the inner profile of the mounting frame and the outer profile of the rotatable body form a rotatable joint; and a key portion disposed on the second end of the rotatable body and operable to rotate the rotatable body relative to the mounting frame.

2. The light bulb of claim 1, wherein the key portion comprises:

an end cap having a first side facing the second end of the rotatable body; and a rib portion extending from a second side of the end cap.

3. The light bulb of claim 2, further comprising a connection cord disposed through an opening formed through the end cap.

4. The light bulb of claim 2, further comprising:

a cooling fan attached to the second end of the rotatable body, wherein the end cap covers the cooling fan.

5. The light bulb of claim 1, wherein the key portion comprises:

an end cap having a first side facing the second end of the rotatable body, wherein aa key slot is formed on a second side of the end cap.

6. The light bulb of claim 5 wherein the key portion further comprises: an electric insert portion extending from the first side of the end cap, wherein the electric insert portion is fixedly attached to the second end of the rotatable body; and two connection rings disposed on an outer diameter of the electric insert portion.

7. The light bulb of claim 1, further comprising:

two connection rings disposed in the rotatable joint; and a power connector in contact with the two connection rings.

8. The light bulb of claim 7, wherein the two connection rings are disposed in grooves on the outer profile of the rotatable body, and the power connector is disposed in the mounting frame.

9. The light bulb of claim 1, further comprising a seal ring disposed between the outer profile and the inner profile.

10. The light bulb of claim 1, wherein the key portion comprises:

an end cap having a first side facing the second end of the rotatable body, wherein a tool slot is formed on a second side of the end cap, and the tool slot is configured to receive a rotating tool.

11. The light bulb of claim 10, further comprising a connection cord disposed through an opening formed through the end cap.

12. The light bulb of claim 1, wherein the mounting frame comprises: a core portion having the inner profile; and a heatsink extending from the core portion.

13. The light bulb of claim 12, wherein the mounting frame further comprises: a power connector housing extending from the core portion; and a power connector disposed in the power connector housing, wherein the power connector comprises two connection prongs in contact with the two connection rings.

14. The light bulb of claim 1, wherein the one or more light sources comprise one or more light emitting diodes (LEDs).

15. The light bulb of claim 14, further comprising a drive circuit board disposed near the second end of the rotatable body.

16. A method for installing a vehicle light, comprising:

providing a light bulb comprising:

a rotatable body having a first end, a second end opposing the first end, and an outer profile;

one or more light sources attached to near the first end of the rotatable body;

a mounting frame having a mounting feature and an inner profile, wherein the mounting feature is configured to secure a lamp housing, and the inner profile of the mounting frame and the outer profile of the rotatable body form a rotatable joint; and a key portion disposed on the second end of the rotatable body and operable to rotate the rotatable body relative to the mounting frame inserting the light bulb into a lamp housing;

fixedly attaching the mounting frame of the light bulb to the lamp housing; and then rotating the key portion to adjust the rotatable body relative to the mounting frame.

17. The method of claim 16, wherein rotating the key portion comprises applying a torque to a rib portion extending from an end cap of the key portion.

18. The method of claim 16, wherein rotating the key portion comprises:

inserting a detachable key into a tool slot formed on the key portion; and applying a torque to the detachable key.

19. The method of claim 18, wherein the detachable key is a specialized key.

20. The method of claim 18, wherein the detachable key is a standard hand tool.

* * * * *